(12) United States Patent
Jindal et al.

(10) Patent No.: US 11,074,256 B2
(45) Date of Patent: Jul. 27, 2021

(54) LEARNING OPTIMIZER FOR SHARED CLOUD

(71) Applicant: Microsoft Technology Licensing, LLC, Redmond, WA (US)

(72) Inventors: Alekh Jindal, Kirkland, WA (US); Hiren Patel, Bothell, WA (US); Saeed Amizadeh, Seattle, WA (US); Chenggang Wu, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 459 days.

(21) Appl. No.: 16/003,227

(22) Filed: Jun. 8, 2018

(65) Prior Publication Data
US 2019/0303475 A1 Oct. 3, 2019

Related U.S. Application Data

(60) Provisional application No. 62/650,330, filed on Mar. 30, 2018.

(51) Int. Cl.
| | | |
|---|---|---|
| *G06F 16/2453* | (2019.01) | |
| *G06N 3/08* | (2006.01) | |
| *G06N 5/00* | (2006.01) | |
| *G06N 5/02* | (2006.01) | |

(52) U.S. Cl.
CPC .. *G06F 16/24534* (2019.01); *G06F 16/24545* (2019.01); *G06N 3/08* (2013.01); *G06N 5/003* (2013.01); *G06N 5/022* (2013.01)

(58) Field of Classification Search
CPC ........ G06F 16/24534; G06F 16/24545; G06N 3/08; G06N 5/003; G06N 5/022
See application file for complete search history.

(56) References Cited

U.S. PATENT DOCUMENTS

| | | | | |
|---|---|---|---|---|
| 2004/0128287 A1* | 7/2004 | Keller | ............... | G06F 16/24545 |
| 2005/0228779 A1* | 10/2005 | Chaudhuri | ........ | G06F 16/24545 |
| | | | | 707/999.003 |
| 2017/0323200 A1 | 11/2017 | Corvinelli et al. | | |

(Continued)

OTHER PUBLICATIONS

"Amazon Athena", Retrieved from: https://web.archive.org/web/20170912003651/https://aws.amazon.com/athena/, Sep. 12, 2017, 8 Pages.

(Continued)

*Primary Examiner* — Scott A. Waldron
(74) *Attorney, Agent, or Firm* — Rainier Patents, P.S.

(57) ABSTRACT

Described herein is a system and method for training cardinality models in which workload data is analyzed to extract and compute features of subgraphs of queries. Using a machine learning algorithm, the cardinality models are trained based on the features and actual runtime statistics included in the workload data. The trained cardinality models are stored. Further described herein is a system and method of predicting cardinality of subgraphs of a query. Features for the subgraphs of the query are extracted and computed. Cardinality models are retrieved based on the features of the subgraphs of the query. Cardinalities of the subgraphs of the query are predicted using the retrieved cardinality models. One of the subgraphs of the query is selected to be utilized for execution of the query based on the predicted cardinalities.

20 Claims, 33 Drawing Sheets

(56) References Cited

U.S. PATENT DOCUMENTS

2018/0157978 A1* 6/2018 Buda .................. G06N 20/00
2020/0125568 A1* 4/2020 Idicula ................ G06F 16/217

OTHER PUBLICATIONS

"Data Lake", Retrieved from: https://azure.microsoft.com/en-us/solutions/data-lake/, Retrieved on Mar. 5, 2018, 7 Pages.
"Google BigQuery", Retrieved from: https://cloud.google.com/bigquery, Retrieved on Mar. 5, 2018, 20 Pages.
"TPC-H Benchmark", Retrieved from: http://www.tpc.org/tpch/, Retrieved on Mar. 5, 2018, 1 Page.
Agarwal, et al., "BlinkDB: Queries with Bounded Errors and Bounded Response Times on Very Large Data", In Proceedings of the 8th ACM European Conference on Computer Systems, Apr. 15, 2013, pp. 29-42.
Agarwal, et al., "Re-optimizing Data-Parallel Computing", In Proceedings of the 9th USENIX Conference on Networked Systems Design and Implementation, Apr. 25, 2012, pp. 1-14.
Astrahan, et al., "System R: Relational Approach to Database Management", In Journal ACM Transactions on Database Systems, vol. 1, Issue 2, Jun. 1, 1976, pp. 97-137.
Boutin, et al., "Apollo: Scalable and coordinated scheduling for cloud-scale computing", In Proceedings of 11th USENIX Conference on Operating Systems Design and Implementation, Oct. 6, 2014, pp. 285-300.
Chaiken, et al., "SCOPE: easy and efficient parallel processing of massive data sets", In Proceedings of the VLDB Endowment vol. 1, Issue 2, Aug. 23, 2008, pp. 1265-1276.
Graefe, Goetz, "The Cascades Framework for Query Optimization", In Proceedings of the IEEE Data Engineering Bulletin, vol. 18, Issue 3, Sep. 1995, pp. 19-28.
Graefe, et al., "The Volcano Optimizer Generator: Extensibility and Efficient Search", In Proceedings of the Ninth International Conference on Data Engineering, Apr. 19, 1993, pp. 209-218.
Gu, et al., "Testing the Accuracy of Query Optimizers", In Proceedings of the Fifth International Workshop on Testing Database Systems, May 21, 2012, 6 Pages.
Ioannidis, et al., "On the Propagation of Errors in the Size of Join Results", In Proceedings of the ACM SIGMOD International Conference on Management of Data, Mar. 21, 1991, pp. 268-277.
Jindal, et al., "Computation Reuse in Analytics Job Service at Microsoft", In Proceedings of International Conference on Management of Data, Jun. 10, 2018, 13 Pages.
Jyothi, et al., "Morpheus: Towards automated slos for enterprise clusters", in Proceedings of the 12th USENIX conference on Operating Systems Design and Implementation, Nov. 2, 2016, 18 Pages.
Kandula, et al., "Quickr: Lazily Approximating Complex AdHoc Queries in BigData Clusters", In Proceedings of the International Conference on Management of Data, Jun. 26, 2016, 16 Pages.
Karanasos, et al., "Dynamically optimizing queries over large scale data platforms", In Proceeding of ACM SIGMOD International Conference on Management of Data, Jun. 22, 2014, pp. 943-954.
Leis, et al., "How Good Are Query Optimizers, Really?", In Proceedings of VLDB Endowment, vol. 9, Nov. 2015, pp. 204-215.
Lohman, Guy, "Is Query Optimization a "Solved" Problem?", Retrieved from: http://wp.sigmod.org/?p=1075, Apr. 10, 2014, 11 Pages.
Rajan, et al., "PerfOrator: eloquent performance models for resource optimization", In Proceedings of the Seventh ACM Symposium on Cloud Computing, Oct. 5, 2016, pp. 415-427.
Selinger, et al., "Access path selection in a relational database management system", In Proceedings of the ACM SIGMOD international conference on Management of data, May 30, 1979, pp. 23-34.
Shanbhag, et al., "A Robust Partitioning Scheme for Ad-hoc Query Workloads.", In Proceedings of the Symposium on Cloud Computing, Sep. 24, 2017, 13 Pages.
Stillger, et al., "LEO—DB2's LEarning Optimizer", in Proceedings of the 27th International Conference on Very Large Data Bases, Sep. 11, 2001, 10 Pages.
Sun, et al., "Fine-grained Partitioning for Aggressive Data Skipping", In Proceedings of the ACM SIGMOD International Conference on Management of Data, Jun. 22, 2014, 12 Pages.
Trummer, et al., "A Fast Randomized Algorithm for Multi-Objective Query Optimization", In Proceedings of the International Conference on Management of Data, Jun. 26, 2016, pp. 1737-1752.
Zhou, et al., "SCOPE: parallel databases meet MapReduce", In the International Journal on Very Large Data Bases, vol. 21, Issue 5, Oct. 2012, pp. 611-636.
Jindal, et al., "Selecting Subexpressions to Materialize at Datacenter Scale", In Proceedings of International Conference on Very Large Data Bases, vol. 11, Issue 7, Mar. 2018, pp. 800-812.
"International Search Report and Written Opinion Issued in PCT Patent Application No. PCT/US19/023777", dated Jun. 21, 2019, 11 Pages.
Geerts, Floris, "Cardinality Estimation, Flow Many Rows Does a Query Yield?" retrieved from http://adrem.ua.ac.be/sites/adrem.ua.ac.be/files/db2-selectivity.pdf on Jun. 7, 2018, 36 pages.
Wu, Chenggang, et al., "Towards a Learning Optimizer for Shared Clouds", Proceedings of VLDB Endowment, vol. 2, issue 3 Nov. 2018, pp. 210-222.

* cited by examiner

Impact of ignoring subgraphs in adjustment factors.

(a) Comparing different models (a) Predicted vs Actual Cardinality (a) Varying Train Duration (1-day test)

(b) Varying Test Duration (1-week train)

(b) Percentage plan cost change (a) Query Runtime (b) Total CPU-hours (c) Total Vertices Launched (a) Cost comparison (b) Subgraph observations collected (c) Exploration runs over varying inputs

LEARNING OPTIMIZER FOR SHARED CLOUD

RELATED APPLICATION

This application claims priority to U.S. Provisional Application No. 62/650,330, filed Mar. 30, 2018, entitled "Learning Optimizer for Shared Cloud", the disclosure of which is hereby incorporated by reference herein in its entirety.

BACKGROUND

Modern shared cloud infrastructures offer analytics in the form of job-as-a-service, where the user pays for the resources consumed per job. The job service takes care of compiling the job into a query plan, using a typical cost-based query optimizer. However, the cost estimates are often incorrect leading to poor quality plans and higher dollar costs for the end users.

SUMMARY

Described herein is a system for training cardinality models, comprising: a computer comprising a processor and a memory having computer-executable instructions stored thereupon which, when executed by the processor, cause the computer to: analyze workload data to extract and compute features of subgraphs of queries; using a machine learning algorithm, train the cardinality models based on the features and actual runtime statistics included in the workload data; and store the trained cardinality models.

Described herein is a method of predicting cardinality of subgraphs of a query, comprising: extracting and computing features for the subgraphs of the query; retrieving cardinality models based on the features of the subgraphs of the query; predicting cardinalities of the subgraphs of the query using the retrieved cardinality models; and selecting one of the subgraphs of the query to utilize for execution of the query based on the predicted cardinalities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
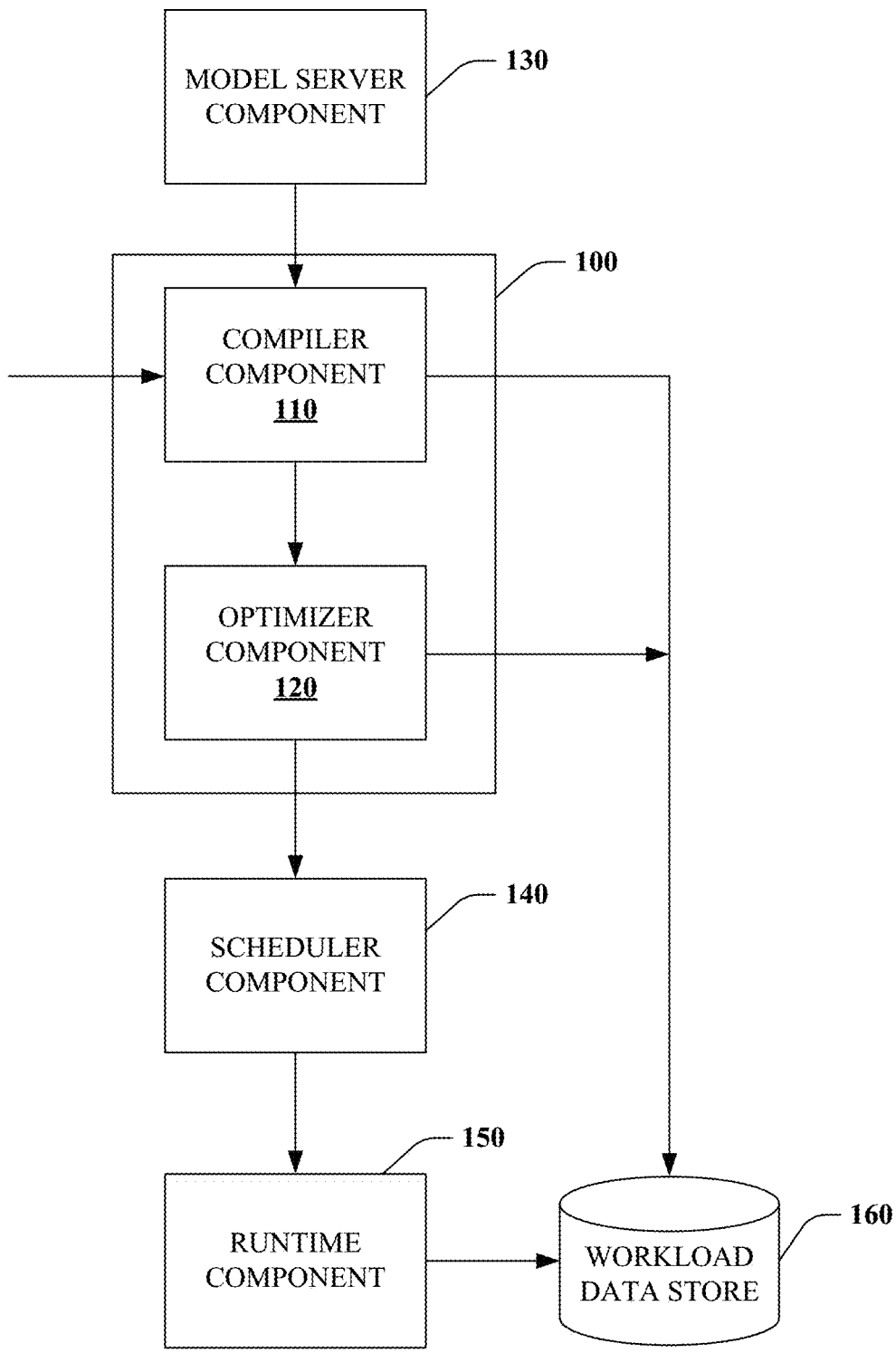
FIG. 1 is a functional block diagram that illustrates a system for predicting cardinality of subgraphs of a query.

Various technologies pertaining to using a machine learning approach to learn (e.g., train) a cardinality model based upon previous job executions, and/or using the cardinality model to predict cardinality of a query are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding using a machine learning approach to learn (e.g., train) a cardinality model based upon previous job executions, and/or using the cardinality model to predict cardinality of a query. What follows are one or more exemplary systems and methods.

Aspects of the subject disclosure pertain to the technical problem of accurately predicting cardinality of a query. The technical features associated with addressing this problem involve training cardinality models by analyzing workload data to extract and compute features of subgraphs of queries; using a machine learning algorithm, training the cardinality models based on the features and actual runtime statistics included in the workload data; and, storing the trained cardinality models. The technical features associated with addressing this problem further involve predicting cardinality of subgraphs of a query by extracting and computing features for subgraphs of the query; retrieving cardinality models based upon the features of the subgraphs of the query; predicting cardinality of the subgraphs of the query using the cardinality models; and, selecting one of the subgraphs to utilize for execution of the query based on the predicted cardinalities. Accordingly, aspects of these technical features exhibit technical effects of more efficiently and effectively providing a response to a query, for example, reducing computing resource(s) and/or query response time.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Interestingly, prior works have shown how inaccurate cardinalities, i.e., the size of intermediate results in a query plan, can be a root cause for inaccurate cost estimates. The systems and methods disclosed herein encompass a machine learning based approach to learn cardinality models from previous job executions, and use the learned cardinality models to predict the cardinalities in future jobs. This approach can leverage the observation that shared cloud workloads are often recurring and overlapping in nature, and thus learning cardinality models for overlapping subgraph templates can be beneficial.

The cardinality (and cost) estimate problem are motivated by the overlapping nature of jobs. Additionally, various learning approaches are set forth along with a discussion of how, in some embodiments, learning a large number of smaller models results in high accuracy and explainability. Additionally, an optional exploration technique to avoid learning bias by considering alternate join orders and learning cardinality models over them is provided.

Referring to FIG. 1, a system for predicting cardinality of subgraphs of a query 100 is illustrated. The system 100 can predict cardinality of subgraphs of the query using one or more stored cardinality models, as discussed below. The system 100 includes a compiler component 110 that retrieves cardinality models relevant to the query from a model server component 130. The compiler component 110 can provide the cardinality models as annotation(s) to an optimizer component 120.

The optimizer component 120 can extract and compute features for subgraphs of the query. The optimizer component 120 can retrieve cardinality models based upon the features of subgraphs of the query. The optimizer component 120 can further predict cardinality of the subgraphs using the retrieved cardinality models. The optimizer component 120 can select one of the subgraphs to utilize for the query based on the predicted cardinalities.

A scheduler component 140 schedules execution of the query based upon the selected subgraph. A runtime component 150 executes the query based upon the selected subgraph.

In some embodiments, the compiler component 110 can provide compiled query directed acyclic graphs ("DAGs" also referred herein as "subgraphs") to a workload data store 160. In some embodiments, the optimizer component 120 can provide optimized plan(s) and/or estimated statistics regarding the selected subgraph to the workload data store 160. In some embodiments, the scheduler component 140 can provide information regarding execution graph(s) and/or resource(s) regarding the selected subgraph to the workload data store 160. In some embodiments, the runtime component 150 can provide actual runtime statistics regarding the selected subgraph to the workload data store 160.

Figure 2:
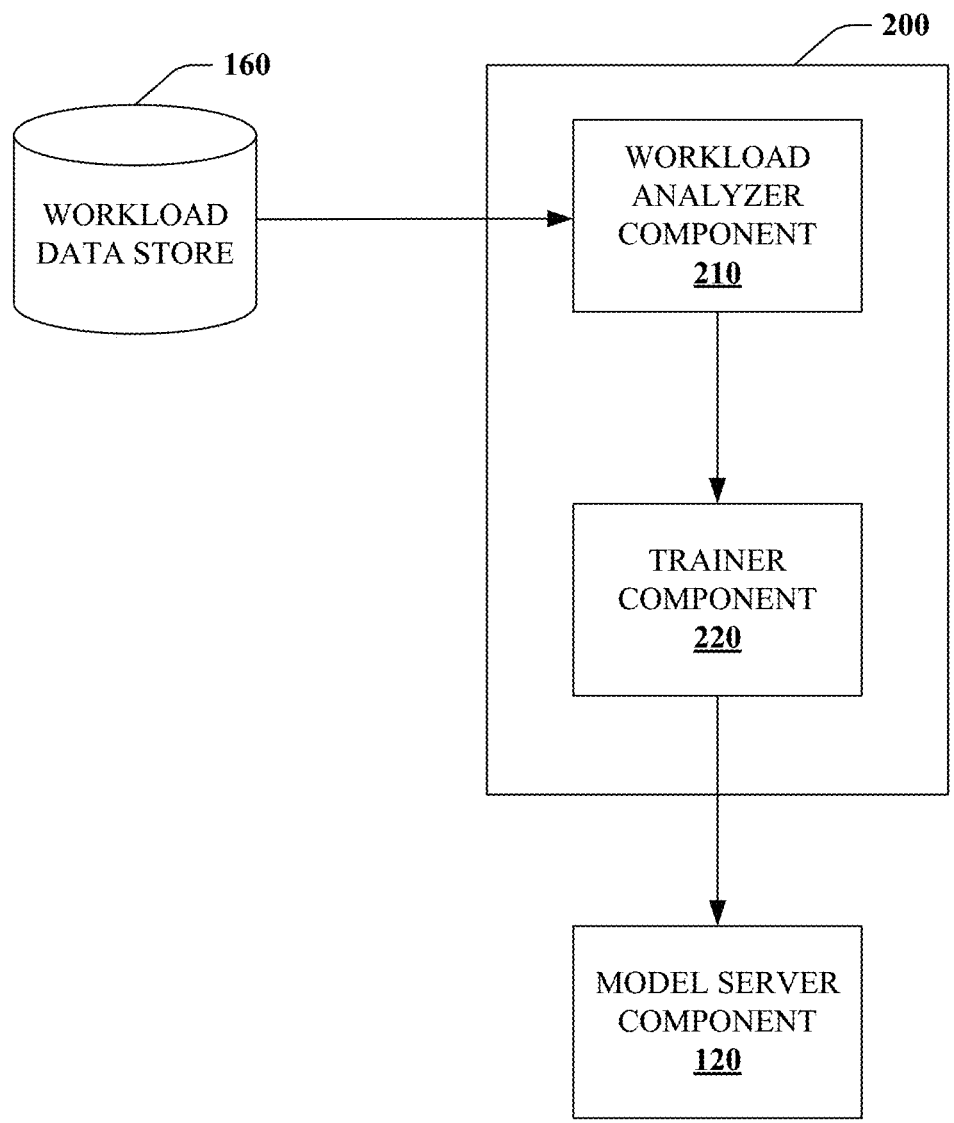
FIG. 2 is a functional block diagram that illustrates a system for training a cardinality model.

Turning to FIG. 2, a system for training a cardinality model 200 is illustrated. The system 200 includes a workload analyzer component 210 that analyzes workload data (e.g., stored in the workload data store 160) to extract and compute features for training cardinality models stored in the model server component 130. The extracted and computed features are discussed more fully below.

The system 200 further includes a trainer component 220 that, using a machine learning algorithm, trains cardinality models stored in the model server component 130 based on the features of subgraphs of queries and actual runtime statistics included in the workload data (e.g., stored in the workload data store 160). The machine learning algorithms are discussed more fully below. The trainer component 220 stores the trained cardinality models in the model server component 130.

Figure 3:
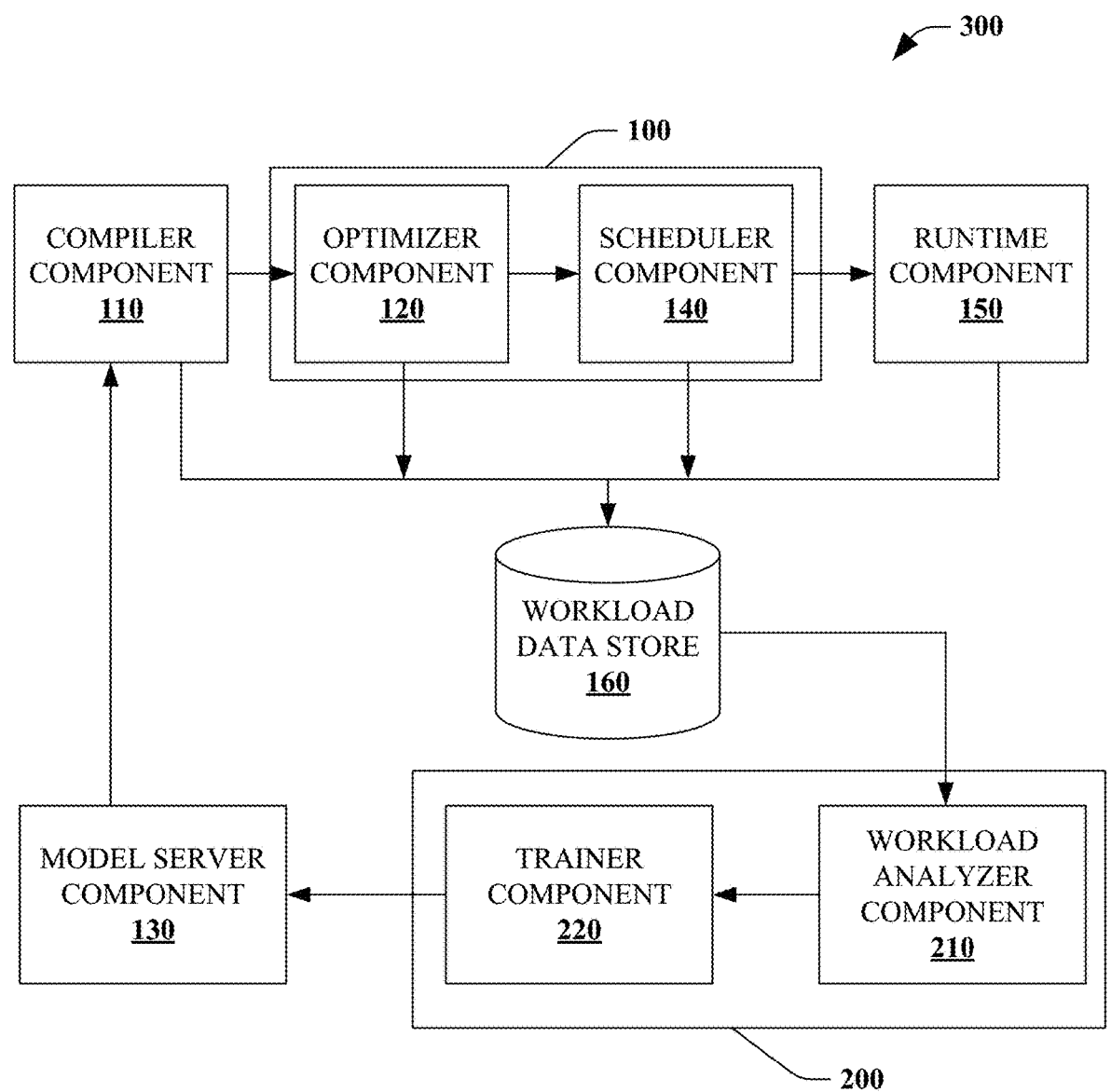
FIG. 3 is a functional block diagram that illustrates a feedback loop architecture.

FIG. 3 illustrates a feedback loop architecture 300 that includes the system for predicting cardinality of subgraphs of a query 100 and the system for training a cardinality model 200, as discussed below.

INTRODUCTION

Shared cloud infrastructures with job-as-a-service have become a popular choice for enterprise data analytics. The job service takes care of optimizing the user jobs into a query plan, using a query optimizer, and dynamically allocating resources needed to run that plan. Users only pay for the resources actually used per job. Thus, both the performance and the monetary cost that are required to be paid by the users depend on the quality of the plans chosen by the query optimizer. Generally, query optimizers choose a query plan by computing the estimated costs of candidate plans, using a cost model, and picking the least expensive plan. However, the accuracy of these estimated costs is a major problem, leading to poor quality plans, and thus poor performance and high monetary costs. Interestingly, these inaccuracies in cost estimates can be rooted in inaccurate cardinalities (i.e., estimation of the size of intermediate results).

While a cost model may introduce errors of at most 30% for a given cardinality, the cardinality can quite easily introduce errors of many orders of magnitude. This has been further validated with the conclusion that, in some embodiments, the cost model has much less influence on query performance than the cardinality estimates.

Cardinality estimation is a difficult problem due to unknown operator selectivities (ratio of output and input data sizes) and correlations between different pieces of the data (e.g., columns, keys). Furthermore, the errors propagate exponentially thus having greater impact for queries with larger DAGs. The problem becomes even more difficult in the big data space due to the presence of large amounts of both structured as well as unstructured data and the pervasive use of custom code via user defined functions. Unstructured data has schema imposed at runtime (e.g., on the fly) and so it can be difficult to collect cardinality statistics over the data. Likewise, user code can embed arbitrary application logic resulting in arbitrary output cardinalities.

The subject disclosure utilizes cardinality models trained from previous executions (e.g., via a feedback loop) thus benefiting from the observation that shared cloud workloads are often repetitive and overlapping in nature. Optionally, the subject disclosure utilizes an active learning approach to explore and discover alternative query plan(s) in order to overcome learning bias in which alternate plans that have high estimated cardinalities but lower actual cardinalities are not tried resulting in a local optima trap.

In some embodiments, the machine learning based approach to improve cardinality estimates occurs at each point in a query graph. Subgraph templates that appear over multiple queries are extracted and a cardinality model is learned over varying parameters and inputs to those subgraph templates.

Motivation

In this section, the problem of cost and cardinality estimates in a particular set of SCOPE workloads are illustrated, which provides the motivation for the approach disclosed herein. SCOPE refers to a SQL-like language for scale-out data processing. A SCOPE data processing system processes multiple exabytes of data over hundreds of thousands of jobs running on hundreds of thousands of machines.

Figure 4A:
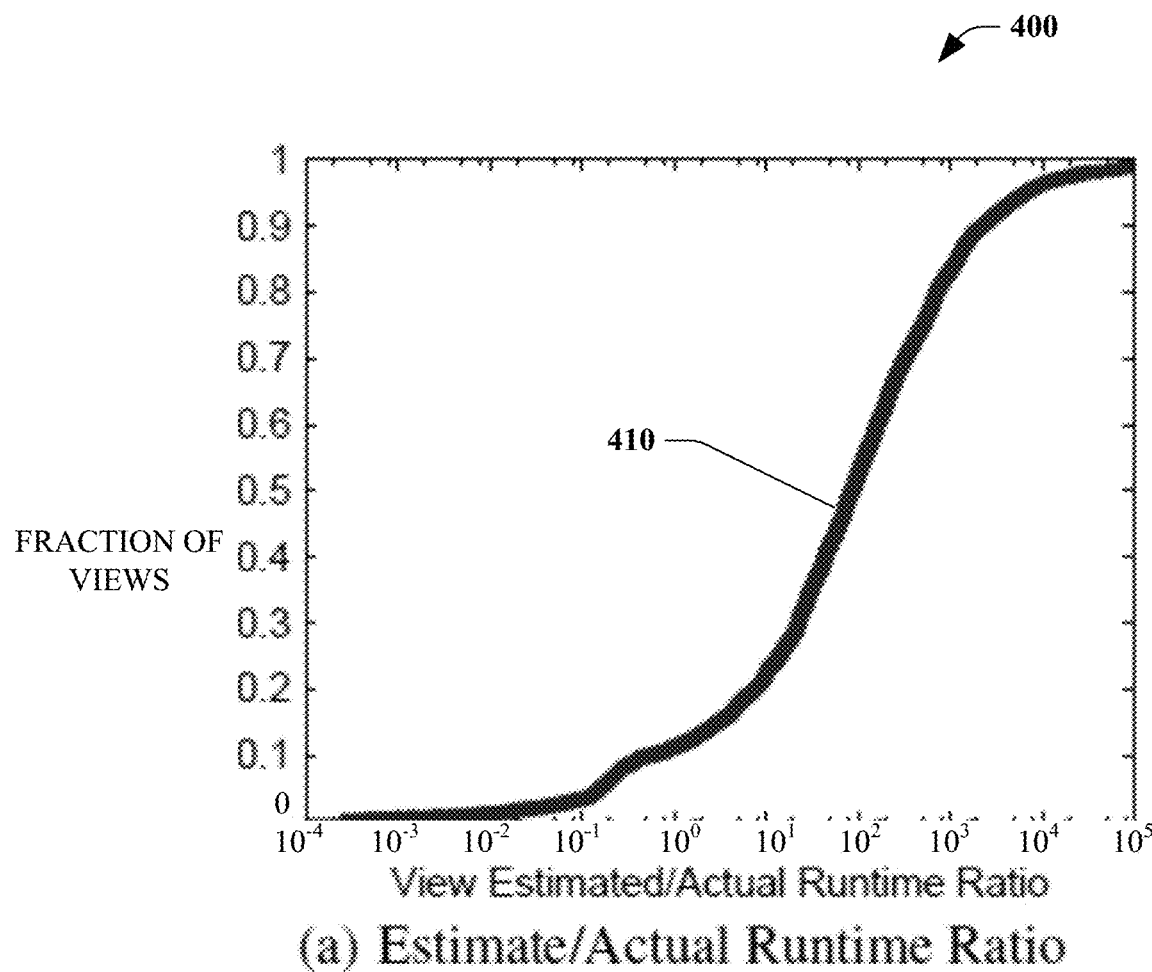
FIG. 4(A) is a graph that illustrates a cumulative distribution of the ratio of estimated costs and the actual runtime costs of different subgraphs.
Figure 4B:
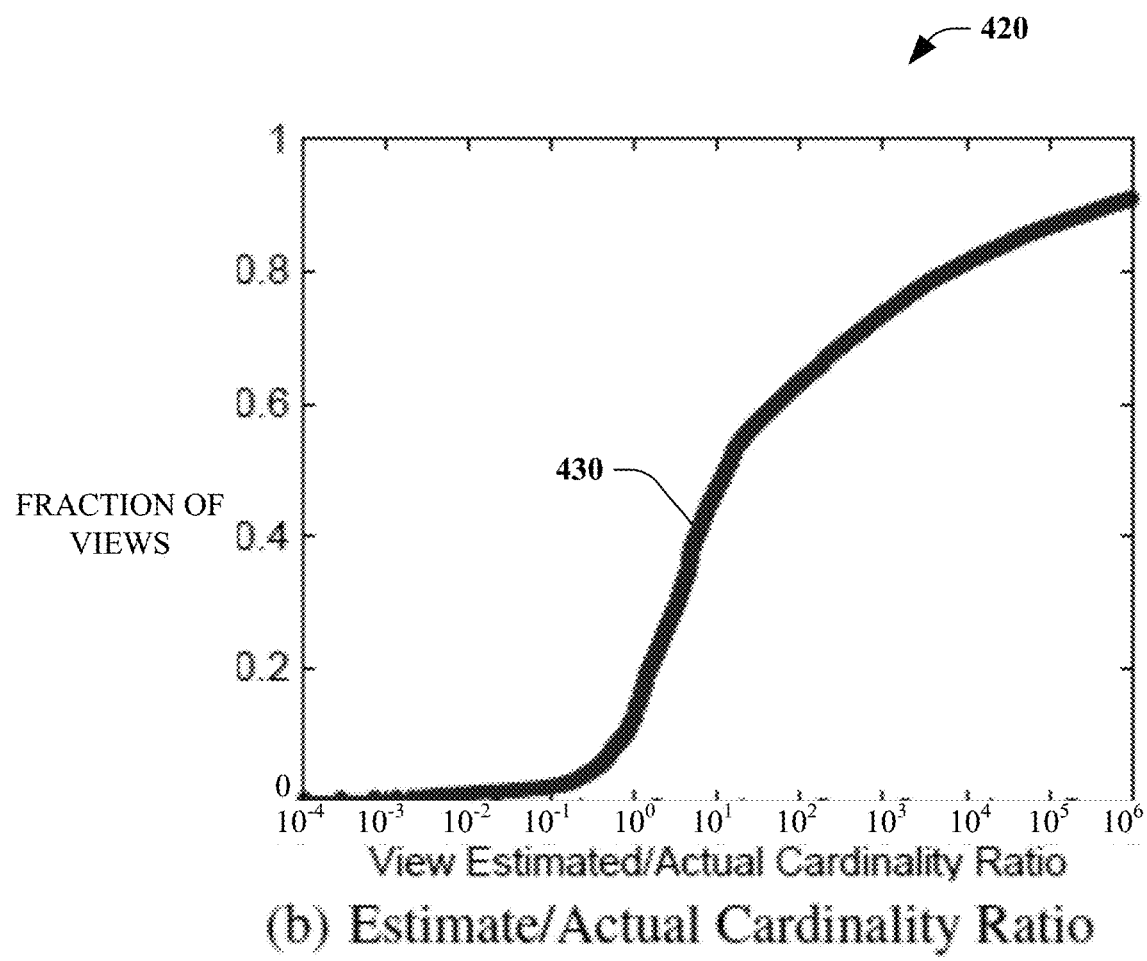
FIG. 4(B) is a graph that illustrates a cumulative distribution of the ratio of estimated and actual cardinalities of different subgraphs.

FIG. 4(A) is a graph 400 that illustrates a cumulative distribution 410 of the ratio of estimated costs and the actual runtime (costs) of different subgraphs. In some embodiments, the estimated costs are up to 100,000 times overestimated and up to 10,000 times underestimated than the actual ones. Likewise, FIG. 4(B) is a graph 420 that illustrates a cumulative distribution 430 of the ratio of estimated and actual cardinalities of different subgraphs. A small fraction of the subgraphs has estimated cardinalities matching the actual ones (i.e., the ratio is 1). Almost 15% of the subgraphs underestimate (by up to 10,000 times) and almost 85% of the subgraphs overestimate (by up to 1 million times). The Pearson correlation coefficient was computed between the estimated and actual costs/cardinalities, and the coefficients both turned out to be very close to zero. As discussed before, estimating cardinalities in a big data system like SCOPE is hard for several reasons (including unstructured data and user defined functions).

Figure 4C:
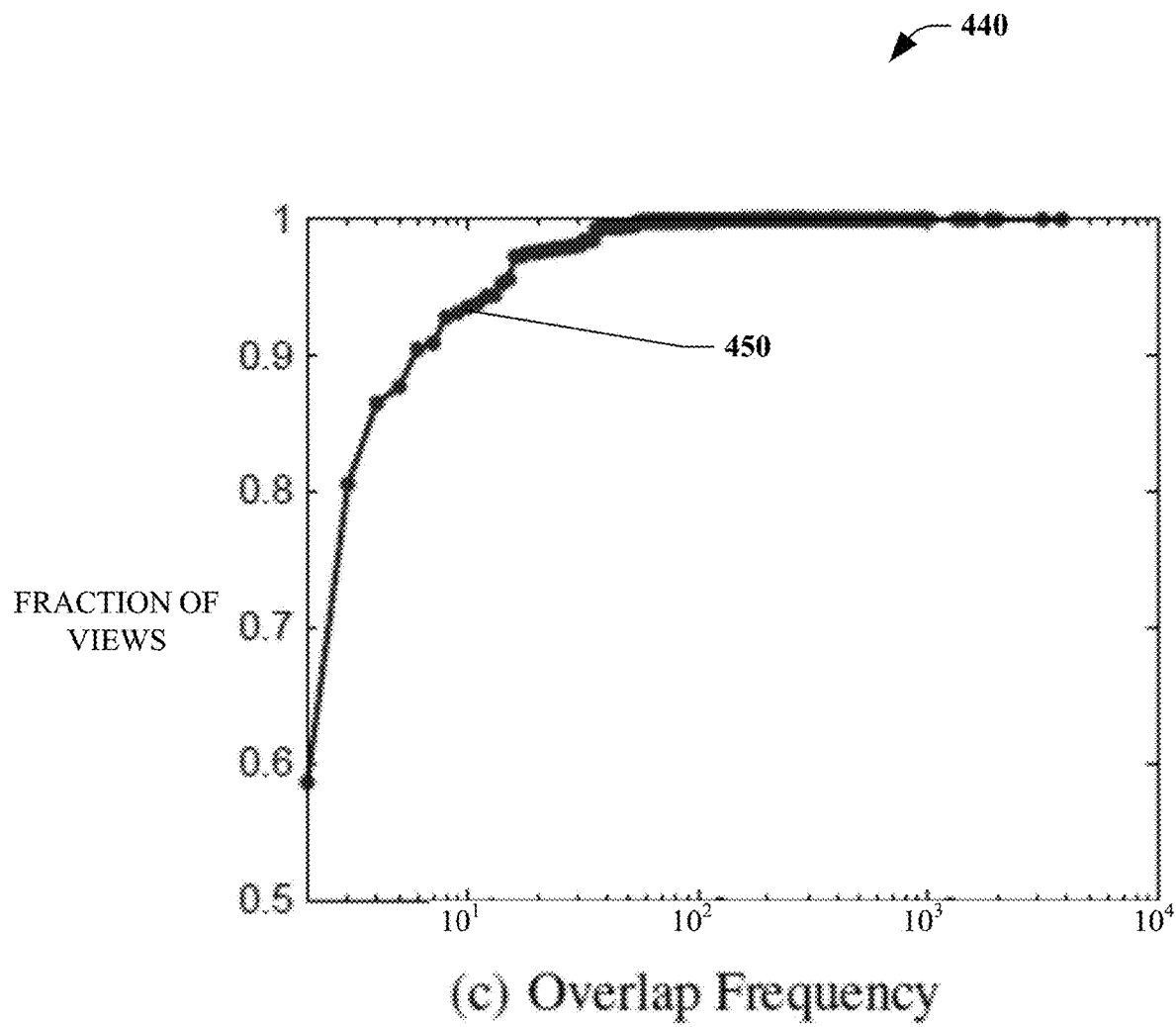
FIG. 4(C) is a graph that illustrates a cumulative distribution of subgraph overlap frequency.

In some embodiments, SCOPE workloads are also overlapping in nature: multiple jobs have common subgraphs across them. These jobs are further recurring in nature, for example, they are submitted periodically with different parameters and inputs. FIG. 4(C) is a graph 440 that illustrates a cumulative distribution 450 of subgraph overlap frequency. 40% of the subgraphs appear at least twice and 10% appear more than 10 times. Thus, with the subject disclosure, subgraph overlaps can be leveraged to learn cardinalities in one job and reuse them in other jobs.

Overview of Machine Learning Based Approach

In some embodiments, the problem of improving cardinality estimates at different points in a query graph is considered. The requirements derived from the current production setting are as follows:

(1) In some embodiments, the improved cardinalities are minimally invasive to the existing optimizer (e.g., no complete replacement necessary). Further, in some embodiments, the improved cardinalities can be selectively enabled, disabled, and/or overridden with user hints.

(2) In some embodiments, an offline feedback loop is utilized in order to learn the cardinalities once with the learned cardinalities utilized repeatedly. Workload traces on clusters can be collected and then post-processed offline.

(3) In some embodiments, low compile time overhead is added to the existing optimizer latencies (e.g., typically 10 s to 100 s of milliseconds).

(4) In some embodiments, the improved cardinalities are explainable.

In some embodiments, a learning-based approach is applied to improve cardinalities using past observations. Subgraphs are considered and their output cardinalities are learned. Thus, instead of learning a single large model to predict possible subgraphs, a large number of smaller models (e.g., with few features) are learned, for example, one for each recurring template subgraph in the workload. In some embodiments, these large number of smaller models are highly accurate as well as much easier to understand. A smaller feature set also makes it easier to extract features during prediction, thereby adding minimal compilation overhead. Furthermore, since learning occurs over recurring templates, the models can be trained a priori (e.g., offline learning).

In some embodiments, the improved cardinalities are provided as annotation (e.g., hints) to the query that can later be applied wherever applicable by the optimizer. That is, the entire cardinality estimation mechanism is not entirely overwritten and the optimizer can still choose which hints to apply.

Learning Cardinality Models

Modern query optimizers incorporate heuristic rule-based models to estimate the cardinalities for each candidate query plan. Unfortunately, these heuristic models often produce inaccurate estimates, leading to significantly poor performance. Given the abundance of prior workloads in big data systems, in some embodiments, predictive models can be learned and used to estimate the cardinalities (e.g., instead of using the heuristics).

Learning Granularity

Given that modern big data systems, e.g., SCOPE, involve complex queries over both structured and unstructured data along with an abundance of user defined code, learning cardinalities for query subgraphs is considered. In some embodiments, a goal is to be able to obtain accurate output row counts for every subgraph in each of the queries. For this purpose, the query subgraphs can be divided into five different categories depending on what part of the subgraph is considered fixed. Table 1 shows these categories and how they are different from each other:

TABLE 1

| Subgraph Type | Operator Graph | Parameters | Data Inputs |
| --- | --- | --- | --- |
| Most Strict | ✓ | ✓ | ✓ |
| Recurring | ✓ | ✓ | X |
| Template | ✓ | X | ✓ |
| Recurring Template | ✓ | X | X |
| Most General | X | X | X |

The top row in Table 1 illustrates one extreme, the most strict subgraphs, where all three variables (operator graph, parameters, and data inputs) are fixed. In this case, the subgraph cardinalities observed in the past are recorded and reused in future occurrences of the exact same subgraphs. While these subgraphs are most accurate, such strict matches are likely to constitute a much smaller fraction of the total subgraphs in the workload (e.g., less than 10% on observed workloads). Hence low coverage is a challenge with the most strict subgraph matches.

The bottom row in Table 1 illustrates the other extreme, where none of the operator graphs, the parameters, and data inputs are fixed. In this case, a single global model is learned that can predict cardinalities for all possible subgraphs, i.e., having full coverage. However, in some embodiments, it turns out that building a single global model is highly challenging for a number of reasons. First, feature engineering (e.g., featurizing subgraphs) is highly impractical in big data systems due to the large number of possible features, including continuous domain parameters, and the massive volume of data that needs to be parsed for featurization. Second, large-scale training of a very large set of training data is required to train one single model, which in turn needs powerful scale-out machine learning tools to be developed. The model needs to be further updated with constantly arriving new data. Third, in some embodiments, prediction latency (e.g., gathering features during prediction) is the most difficult challenge because of the pressing needs of low compile time; in particular, getting features from the input data could require preprocessing that is simply not possible for ad-hoc queries.

In some embodiments, a middle ground can be taken in which cardinalities are learned for each recurring template subgraph (Table 1). A model is built for each operator subgraph, with varying parameters and inputs. This approach can have a number of advantages:

(1) Offline training: In some embodiments, by keeping the operator graphs fixed, the model can be trained once and reused repeatedly. This is due to the presence of recurring jobs in production workloads that have the same operator graph, for example, with different parameters and data inputs in each recurring instance.

(2) Easier to featurize: The parameters provided to each query can be readily used as the features, while for a given operator graph the only data feature that typically matters is input size; the distributions remain relatively the same. As discussed below, in some embodiments, detection and correction of model(s) that become inaccurate can be provided.

(3) Higher coverage: In some embodiments, learning cardinalities for recurring templates gives higher coverage since there is an abundance of recurring and overlapping jobs in production workloads. In some embodiments, the cardinalities for subgraphs can be corrected over inaccurate estimations provided to the optimizer. The cost/time benefits of correcting the cardinalities for the recurring templates can be significant.

(4) Higher accuracy: Although in some embodiments a single model would be convenient, it is quite challenging to have high accuracy due to the highly non-linear nature of the target cardinality function. Instead, in some embodiments, having a large number of smaller models for the capture of the non-linearity generates more accurate predictions.

Featureless Learning

One approach to learn cardinality is via collaborative filtering, which was traditionally developed for the matrix completion problem in recommender systems. To cast the problem as a matrix completion problem, a two-dimensional matrix M is built with the first dimension being an identifier of the query subgraph and the second dimension being an identifier of the input dataset. The entry $M_{ij}$ represents the output cardinality of applying query subgraph i to dataset j. The idea is as follows: given a small set of observed entries in this matrix, the missing (unobserved) entries are desired to be estimated. To do so, first matrix factorization is utilized to compute the latent factors of the query subgraphs and the datasets. Next, in order to predict the output cardinality of applying query subgraph i to dataset j, the latent factor of query subgraph i is multiplied with the latent factor of dataset j.

In some embodiments, three issues were encountered with this approach. First, it was observed that the matrix constructed based on prior observations was extremely sparse, with only less than 0.001% entries filled with values. This is because most of the query subgraphs can only be applied to a small number of datasets, while the subgraphs have schema mismatch with the remaining datasets. The sparsity makes the effectiveness of collaborative filtering challenging. A second issue is that, in some embodiments, unlike classical "movie recommendation" workloads where the score ranges from 1 to 10, the output cardinality in the workload ranges from 0 to millions. As a result, in some embodiments, the large difference in the output cardinality between combinations of query subgraphs and datasets was observed to lead to orders-of-magnitude prediction errors in the collaborative filtering approach. Lastly, in some embodiments, when the collaborative filtering does achieve satisfactory performance (e.g., less than 30% error), it was observed that most of the observations were around the same subgraph template. This can be interesting because for combinations of query subgraphs and datasets that belong to the same subgraph template, there are more features that could be exploited besides simply using the subgraph and the datasets identifiers. A feature-based approach was next considered in which the input dataset and the query subgraph were featurized in order to train a model for each subgraph template separately.

Adjustment Factors

Before considering a more elaborate set of features one important question is whether applying adjustment factors to cardinality estimates can get more accurate values, i.e., use the estimated cardinality as the only feature. The adjustment factor approach may suffer from three problems: (i) ignoring subgraphs and hence missing the changes in data distributions due to prior operations, (ii) presence of large amounts of user code which is often parameterized, and (iii) non-determinism.

Figure 5:
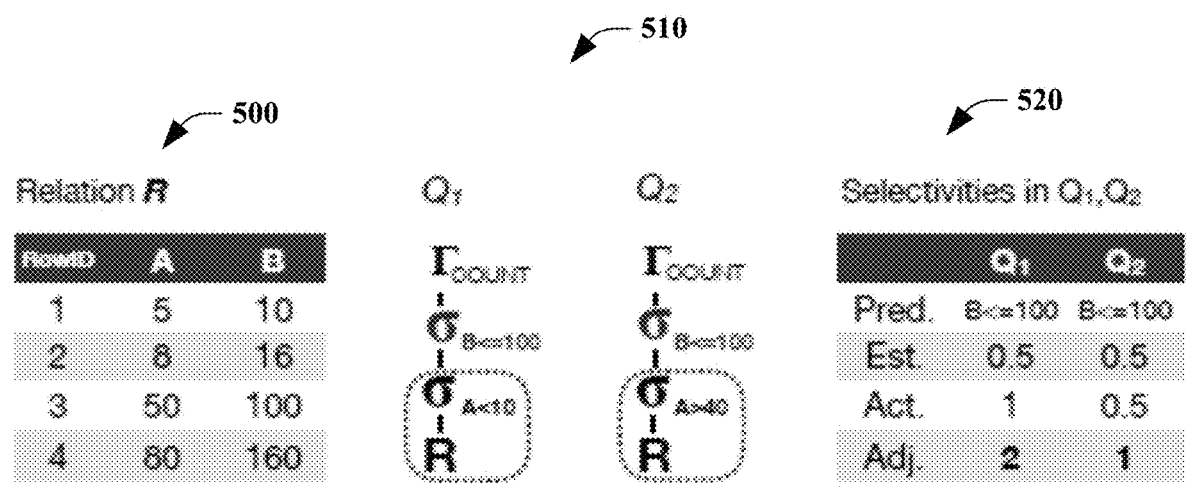
FIG. 5 illustrates diagrams that illustrate an impact of ignoring subgraphs in adjustment factors.

Referring to FIG. 5, diagrams 500, 510, 520 illustrate an impact of ignoring subgraphs in adjustment factors. To illustrate the problem due to ignoring subgraphs, consider a relation R(A, B) of diagram 500 and two queries $Q_1$ and $Q_2$ of diagram 510 over the relation. Both $Q_1$ and $Q_2$ have 2 tuples as input to the filter predicate B≤100. However, while both tuples qualify B≤100 in $Q_1$, only one qualifies in $Q_2$. This is because columns A and B are correlated in R. As a result, a single adjustment factor does not work for predicate B≤100, since it is different for $Q_1$ and $Q_2$. as shown in diagram 520. In some embodiments, detecting such correlations is impractical in big data systems due to massive volumes of data, which is often unstructured and fast arriving. Adjustment factors are further nondeterministic, e.g., it could be 2 or 1 depending on whether $Q_1$ or $Q_2$ gets processed first.

To illustrate the problem with adjustment factors due to user code, Table 2 shows the input and output cardinalities from multiple instances of a recurring reducer from the particular set of SCOPE workloads:

TABLE 2

| Input Cardinality | Output Cardinality |
|---|---|
| 672331 | 1596 |
| 672331 | 326461 |
| 672331 | 312 |
| 672331 | 2 |
| 672331 | 78 |
| 672331 | 1272 |
| 672331 | 45 |
| 672331 | 6482 |

As shown in Table 2, the reducer may receive the exact same input in all the instances; however, the output cardinalities can be very different. This is because the output cardinality depends on the parameters of the reducer. Hence, in some embodiments, simple adjustment factors will not work for complex queries with such user code. To validate this, the percentage error and Pearson correlation (between the actual and predicted cardinality) were compared for different approaches over this dataset. Table 3 shows the result:

TABLE 3

| Model | Percentage Error | Pearson Correlation |
|---|---|---|
| Default Optimizer | 2198654 | 0.41 |
| Adjustment Factor | 1477881 | 0.38 |
| Linear Regression | 11552 | 0.99 |
| Neural Network | 9275 | 0.96 |
| Poisson Regression | 696 | 0.98 |

Table 3 shows that the adjustment factor improves slightly over the default optimizer estimates, but it still has a high estimation error and low correlation. On the other hand, feature-based machine learning models (e.g., linear regression, Poisson regression and neural networks) can reduce the error significantly.

Finally, the variation in output cardinalities of different instances of the same subgraph templates in the SCOPE workload described above were analyzed. The average coefficient of variation is 22%, the 75th percentile is 3.2%, and the 90th percentile is 93%. Thus, in some embodiments, cardinalities vary significantly even for the same subgraph template and simple adjustment factors will not work.

Feature-Based Learning

Based on the information learned regarding the featureless approach and the adjustment factor approach discussed above, an experiment with feature-based methods was performed, where the query subgraph was featurized and a model for each subgraph template was trained. Exemplary features and the selection of models are discussed below.

Feature Engineering

Three types of features were considered as set forth in Table 4:

TABLE 4

| Name | Description |
|---|---|
| JobName | Name of the job containing the subgraph |
| NormJobName | Normalize job name |
| InputCardinality | Total cardinality of all inputs to the subgraph |
| Pow(InputCardinality, 2) | Square of InputCardinality |
| Sqrt(InputCardinality) | Square root of InputCardinality |
| Log(InputCardinality) | Log of InputCardinality |
| AvgRowLength | Average output row length |
| InputDataset | Name of all input datasets to the subgraph |
| Parameters | One or more parameters in the subgraph |

First, metadata such as the name of the job the subgraph belongs to and the name of the input datasets was extracted. In some embodiments, these metadata attributes are important as they could be used as inputs to user-defined operators. In fact, the reason that leads to the orders-of-magnitude difference in the output cardinality between the first and the second row in Table 2 is due to the difference in the name of the job the subgraph belongs to (e.g., everything else is the same for these two observations).

Second, the total input cardinality of all input datasets is extracted. Intuitively, the input cardinality plays a central role in predicting the output cardinality. In some embodiments, in order to account for operators (e.g., cross joins aggregations, and user-defined operators) that can lead to a non-linear relationship between the input and output cardinality, the squared, squared root, and the logarithm of the input cardinality are computed as features.

Finally, since the parameters of operators, such as filter predicates and user defined operators, can have a big impact in the output cardinality, these parameters are extracted as features.

Choice of Model

In some embodiments, three different types of machine learning models (e.g., algorithms) can be utilized for feature-based learning: linear regression (LR), Poisson regression (PR), a and multi-layer perceptron (MLP) neural network. While LR is a purely linear model, PR is slightly more complex and considered as a Generalized Linear Model (GLM). MLP, on the other hand, provides for a fully non-linear, arbitrarily complex predictive function.

The main advantage of using linear and GLM models is their interpretability. In particular, it is easy to extract the learned weights associated with each feature so that which features contribute more or less to the output cardinality can be more readily analyzed. This can be useful for many practical reasons as it gives the analysts an insight into how different input query plans produce different output cardinalities. This simplicity and explainability can however come at a cost: the linear model may not be sufficiently complex to capture the target cardinality function. In machine learning, this is known as the problem of underfitting which puts a cap on the accuracy of the final model regardless of how large the training data is. Also, LR can produce negative predictions which are not allowed in the problem since cardinalities are always non-negative. To rectify this problem, the model output can be adjusted after-the-fact so that it will not produce negative values. PR, on the other hand, does not suffer from this problem as by definition it has been built to model (non-negative) count-based data.

On the other extreme, MLP provides a much more sophisticated and richer modeling framework that in theory is capable of learning the target cardinality function regardless of its complexity, given that access to sufficient training data is provided. In practice, however, training and using an MLP for cardinality estimation can be more challenging than that of LR or PR for some fundamentally important reasons. First, as opposed to LR and PR, using an MLP requires careful designing of the neural network architecture as well as a significant hyper-parameter tuning effort, which in turn requires a deep insight into the problem as well as the model complexity. Second, if enough training data for a given subgraph template is not provided, depending on its complexity, it is very easy for an MLP to memorize the training examples without actually learning how to generalize to future examples, also known as the overfitting problem in machine learning. Finally, it can be quite difficult to explain and justify the output of MLP for human analysts even though the output might an accurate prediction of the cardinality.

Feature Analysis

Figure 6A:
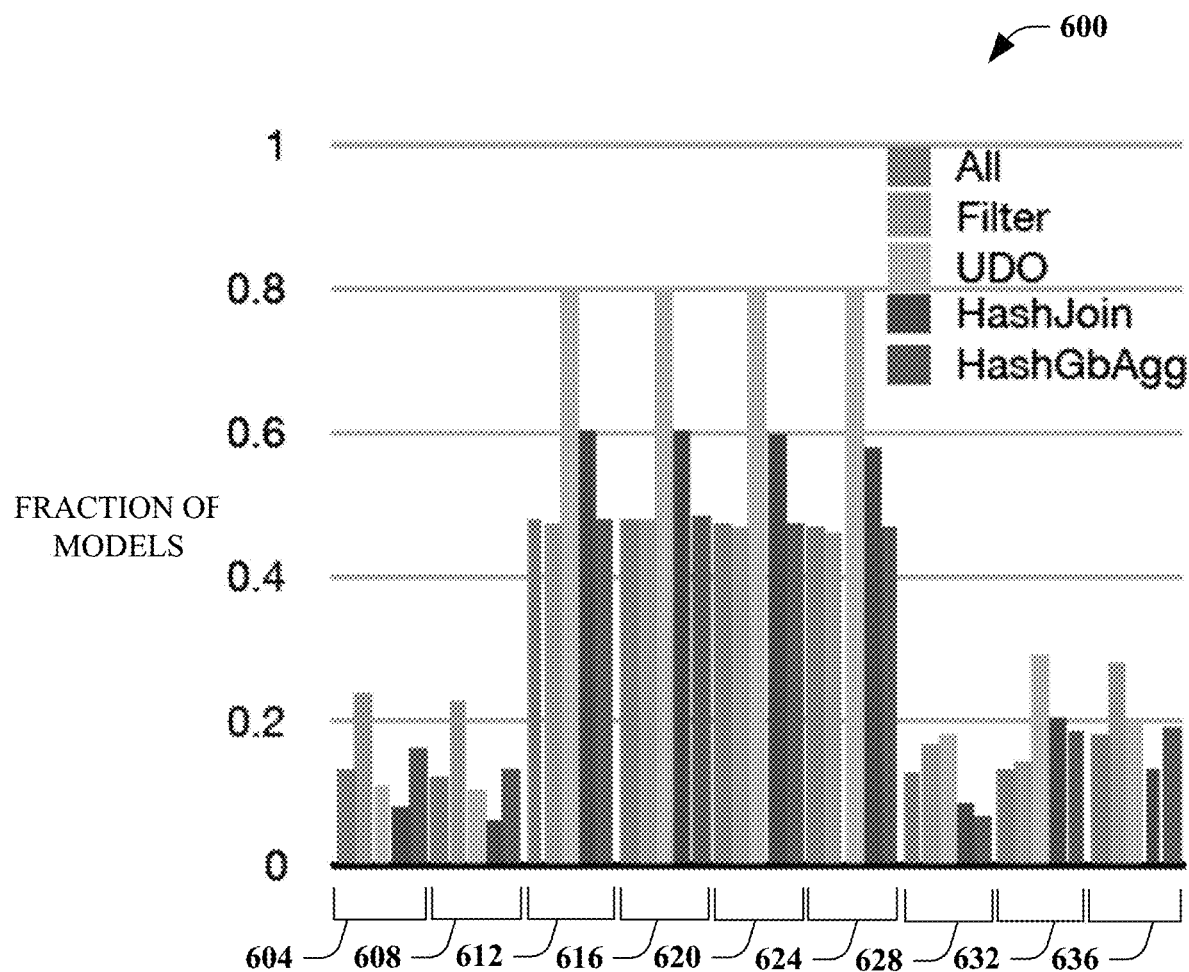
FIG. 6(A) is a bar graph that illustrates the fraction of the models that contain each of particular features.

The features that contribute to the models' prediction are analyzed as follows. The models produced by the Poisson regression algorithm are analyzed because Poisson regression offered the best performed in some embodiments, as discussed below. For each model, the features that do not contribute much to the prediction are given zero weight and are not included in the model. Therefore, by analyzing the set of features that appear in the model, which features contribute more to the prediction result can be learned. FIG. 6(A) is a bar graph 600 that illustrates the fraction of the models that contain each of the features: JobName 604, NormJobName 608, InputCard 612, PowInputCard 616, SqrtInputCard 620, LogInputCard 624, AvgRowLength 628, InputDataset 632, and Params 636. Since each model can have a different number of parameters as features, these parameters are grouped into one feature category named 'Parameters' 636. In some embodiments, across all models trained, it can be observed that InputCardinality 612 plays a central role in model prediction as near 50% of the models contain InputCardinality 612 as a feature. Additionally, the squared 616, squared root 620, and logarithm 624 of the input cardinality also can have a big impact on the prediction. In fact, their fractions are a bit higher than InputCardinality 612. Interestingly, all other features also provide a noticeable contribution. Even the least significant feature, AvgRowLength 628, appears in more than 10% of the models.

The models can be further grouped based on the root operator of the subgraph template, and models whose root operators are Filter, user-defined object (UDO), Join, and Aggregation are analyzed. Within each feature 604, 608, 612, 616, 620, 624, 628, 632, 636, the graph 600 includes data for five groups of operators "All", "Filter" "UDO" (User-defined object), "HashJoin" and "HashBgAgg" from left to right. For Join and UDO, it is observed that the importance of cardinality and input dataset features goes up significantly, possibly due to complex interactions between different datasets for Joins and ad-hoc user-defined data transformations for UDOs. For Filter, it is not surprising to see that Parameters contribute a lot more, as the filtering predicates can have large impact on the output cardinality. For Aggregation, it is observed that the AvgRowLength matters significantly less because a large fraction of the aggregation queries produces a single number as an output, which has the same row length. To summarize, the graph 600 of FIG. 6(A) illustrates that features other than InputCardinality 612 contribute to accurately predicting the output cardinality, and models with different operators have different sets of important features.

Figure 6B:
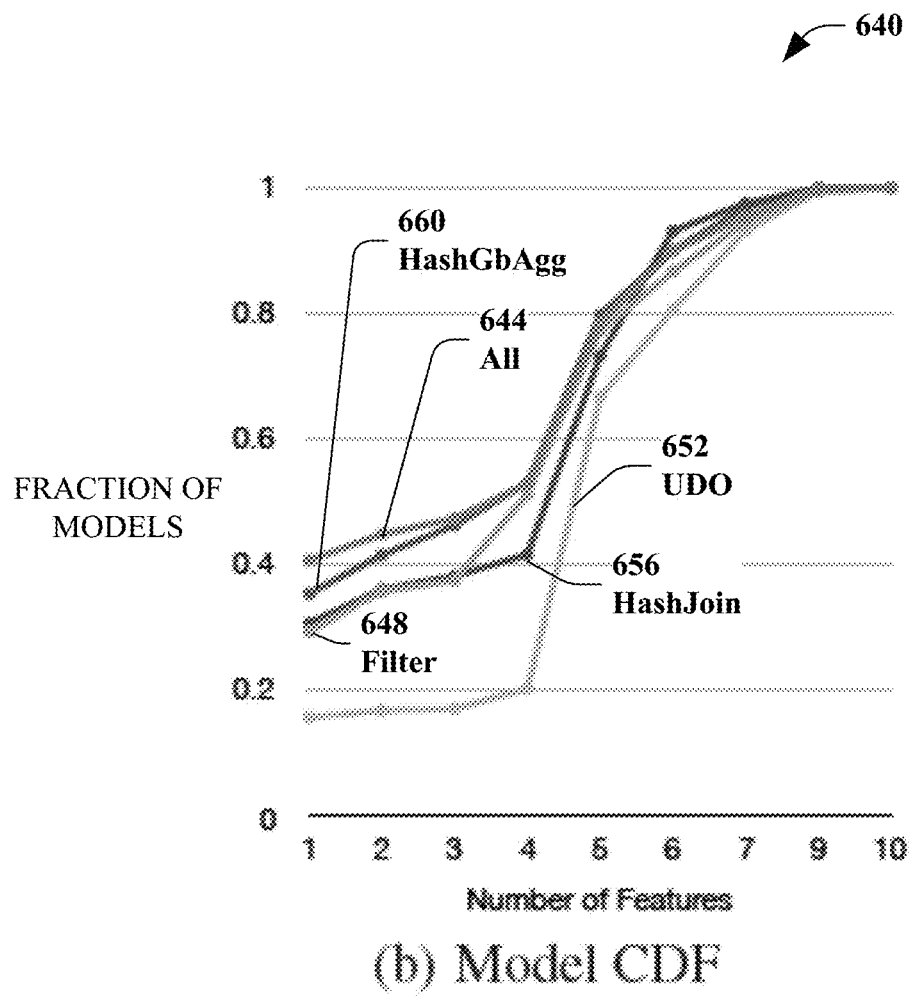
FIG. 6(B) is a graph that shows cumulative distributions of the fraction of models that have certain number of features with non-zero weight.

FIG. 6(B) is a graph 640 that shows cumulative distributions "All" 644, "Filter" 648, "UDO" 652, "HashJoin" 656, "HashGbAgg" 660 of the fraction of models that have a certain number of features with non-zero weight. Overall, it can be observed that more than 55% of the models have at least 3 features that contribute to the prediction, and 20% of the models have at least 6 features. It is worth noting that for models whose root operator are UDOs, more than 80% of the models have at least 5 features. This implies that, in some embodiments, a number of features are needed to jointly predict the output cardinality for subgraphs with complex operators like UDO.

Limitations

The feature-based learning described herein can achieve very good performance, as discussed below. However, there are a few limitations to this approach.

First, the feature-based framework cannot make predictions for unobserved subgraph templates. More data more data can be collected by observing more templates, during the training phase. However, the model still may be unable to improve the performance of ad hoc queries with new subgraph templates.

Second, since in some embodiments a model is trained for each subgraph template, the number of models grows linearly with respect to the number of distinct subgraph templates observed. Therefore, in the case of a limited storage budget, the models can be ranked and filtered based on effectiveness in fixing the wrong cardinality estimation produced by the query optimizer.

Finally, recall that the query optimizer chooses an execution path with the lowest cost. However, when comparing the cost between two paths, if the cost of the first path is computed using the learning model's predicted cardinality and the cost of the second path is computed using the optimizer's default cardinality estimation (e.g., due to missing subgraph template models), directly comparing the two costs could lead to inaccuracy as the optimizer's default cardinality estimation could be heavily overestimating and/or underestimating the cardinality.

Avoiding Learning Bias

Figure 7:
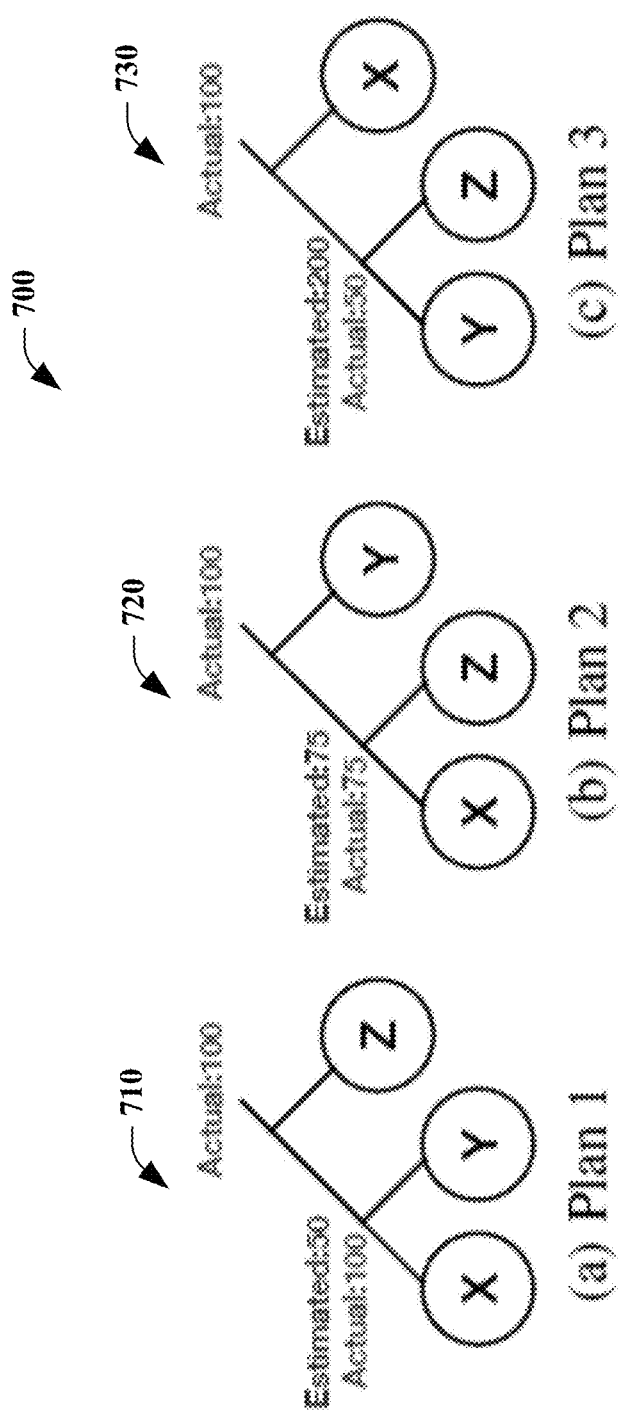
FIG. 7 is a diagram that illustrates an example of three alternate plans for joining three relations.

Learning cardinalities can improve the cost estimates of previously executed subgraph templates. However, since only one plan is executed for a given query, alternate subgraph templates in that query can still exist. For example, FIG. 7 is a diagram 700 that illustrates an example of three alternate plans for joining relations X, Y, and Z, plan1 710, plan2 720 and plan3 730.

For the first time, X⋈Y (plan1 710) has lower estimated cost than X⋈Z and Y⋈Z, and so it will be picked. Once plan1 710 is executed, the actual cardinality of X⋈Y is 100 is known, which is higher than the estimated cardinality of X⋈Z. Therefore, the second time, the optimizer will pick plan2 720. However, even though Y⋈Z is the least expensive option, it is never explored since the estimated cardinality of Y⋈Z is higher than any of the actual cardinalities observed so far. Thus, in some embodiments, a mechanism to explore alternate join orders and build cardinality models of those alternate subgraphs is desired, which can have higher estimated costs but may actually turn out to be less expensive.

Exploratory Join Ordering

In some embodiments, an exploratory join ordering technique is utilized to consider alternate join orders, based on prior observations, and ultimately discover the best one. The core idea is to leverage existing cardinality models and actual runtime costs of previously executed subgraphs to: (i) quickly explore alternate join orders and build cardinality models over the corresponding new subgraphs, and (ii) prune expensive join paths early so as to reduce the search space. In some embodiments, having cardinality models over all possible alternate subgraphs naturally leads to finding the best join order eventually.

Early Pruning

In some embodiments, the number of join orders are typically exponential and executing all of them one by one is simply not possible, even for a small set of relations. Therefore, a technique to quickly prune the search space to only execute the interesting join orders is desired. In some embodiments, whenever a subgraph plan turns out to be more expensive than a full query plan, exploring join orders which involve that subgraph plan can be stopped. For instance, if A⋈C is more expensive than ((A⋈B)⋈C)⋈D, then join orders ((A⋈C)⋈B)⋈D and ((A⋈C)⋈D)⋈B can be pruned, i.e., all combinations involving A⋈C are discarded as the total cost is going to be even higher anyways.

Algorithm 1 shows the pseudocode for early pruning described above:

---
Algorithm 1
---

Algorithm 1: TryPrune
Input: Relation r, Plan p, Query q, RuntimeCosts c, CardModels m
Output: Return null if pruning is possible; otherwise the input plan with updated cardinality, if possible.
1    if c.Contains(r) then
2        if c.GetBestCost(q) < c.GetBestCost(r) then
// prune as outer is more expensive than an overall query plan
3        return null
4    else
5        p.UpdateCard(m.Predict(r))
6    return p

---

The function returns null (Line 3) when the runtime cost of the subgraph plan is more expensive than the cost of the best query plan seen so far; otherwise, it returns the input plan with either the predicted cardinalities (Line 5) or the default estimated cardinalities (Line 6), depending on whether the subgraph has been seen before in previous executions or not.

Exploration Comparator

Figure 8:
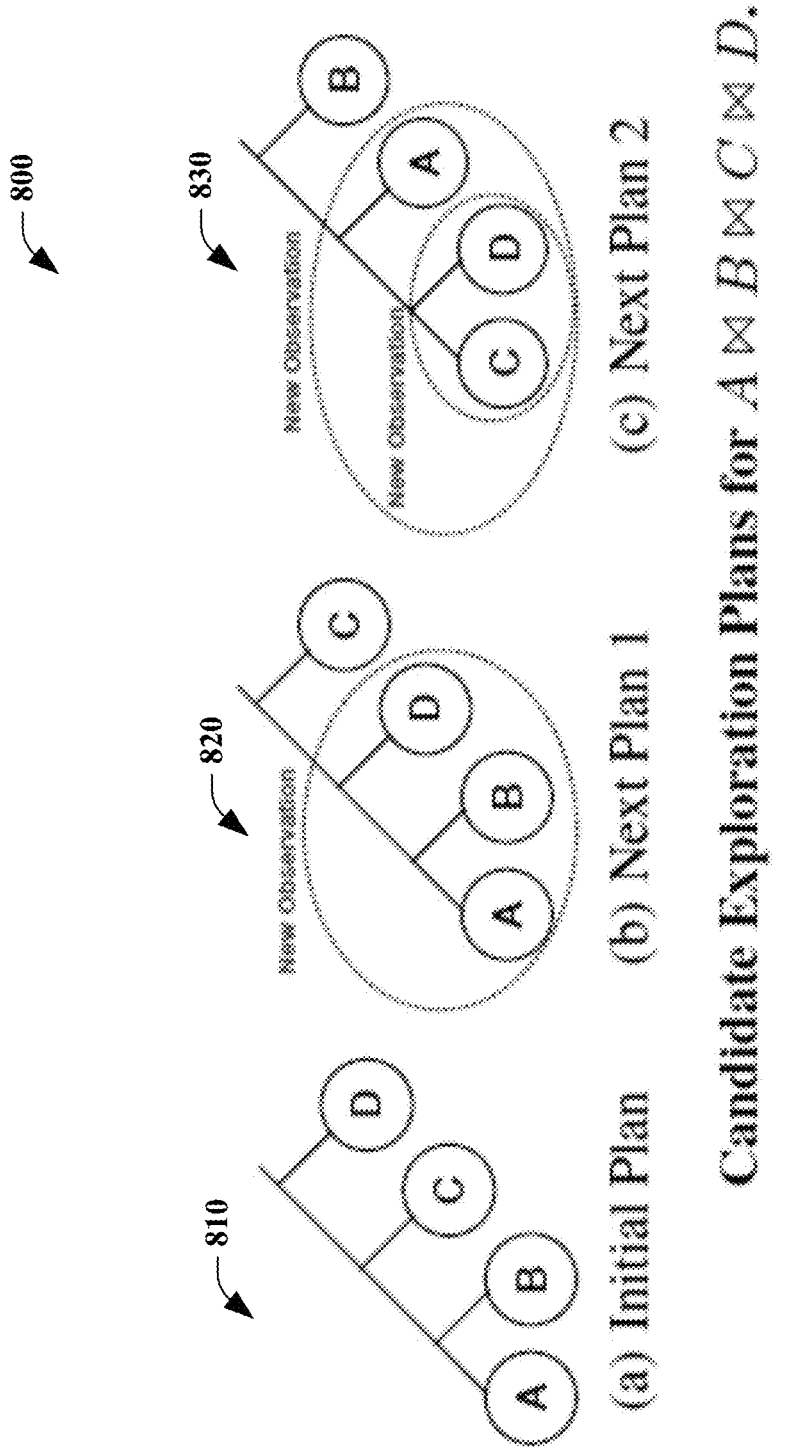
FIG. 8 is a diagram that illustrates an exploration comparator.

The goal of exploratory join ordering is to learn cardinality models for alternate subgraphs. Thus, in some embodiments, for two equivalent plans, it is desired to pick the one that maximizes the number of new subgraphs observed. This is in contrast to the typical approach of picking the least expensive plan amongst equivalent query plans. FIG. 8 is a diagram 800 that illustrates an exploration comparator in which the planner first executes the plan shown in (a) 810 and then considers next plan 1 and next plan 2, shown in (b) 820 and (c) 830. The planner makes only one new observation with plan 1 (820), namely A⋈B⋈D, as A⋈B and A⋈B⋈D⋈C (which is equivalent to A⋈B⋈C⋈D in terms of cardinality) have already been observed. However, with next plan 2 (830), the planner makes two new observations, namely C⋈D and C⋈D⋈A. Thus, next plan 2 (830) is better in terms of number of new observations than next plan 1. Alternatively, in case C⋈D had appeared in some other query, next plan 1 (820) and next plan 2 (830) would have had the same number of observations.

Algorithm 2 pseudo code shows the resulting plan comparator:

---
Algorithm 2
---

Algorithm 2: ExplorationComparator
Input: Plan p1, Plan p2, Ranking ranking, RuntimeCosts c
Output: Return true if p1 is better than p2; false otherwise.
1    h1 = Observations(c, p1)
2    h2 = Observations(c, p2)
3  begin
4        switch ranking do
5            case OPT COST
6                return (p1.cost < p2.cost)
7            case OPT OBSERVATIONS
8                return (h1 < h2) | (h1==h2 & p1.cost < p2.cost)
9            case OPT OVERHEAD
10           return (p1.cost << p2.cost) (p1.cost p2.cost & h1 < h2)

---

In addition to the standard comparison to minimize cost (Lines 5-6 of Algorithm 2), a mode to maximize the number of new observations is provided (Line 7). In case of a tie, the plan with lower cost is picked in order to keep the execution costs low (Line 8). To reduce the overhead even further, the higher observation plan can be picked only if both plans have similar cost (Lines 9-10). The exploration comparator provides a selection mechanism to the planner to explore alternate join orders over multiple runs of the same subgraph.

Exploratory Query Planner

In some embodiments, the early pruning strategy and the exploration plan comparator can be integrated into a query planner for exploratory join ordering. Algorithm 3 pseudo code shows the exploratory version of System R style bottom-up planner, also sometimes referred to as Selinger planner:

---
Algorithm 3
---

Algorithm 3: ExploratoryBottomUpPlanner
Input: Query q, Ranking ranking, RuntimeCosts c, CardModels m
Output: Left-deep plan for the query q.
1    Relation [ ] rels = LeafRels(q)// relations to join
2    Map <Relation,Plan > optPlans = { }
3    foreach r ∈ rels do
4        optPlans[r] = ScanPlan(r)    // generate scan plans
// perform left-deep bottom-up enumeration
5    foreach d ∈ [1, |R| −1] do
6        foreach outer : outer ⊂ R, |outer| = d do
7            foreach inner : inner ∈ (R − outer) do
8                Plan pOuter = optPlans[outer]
9                Plan pInner = optPlans[inner]
10               pOuter = TryPrune(outer, pOuter, q, c, m)
11               pinner = TryPrune(inner, pInner, q, c, m)
12               if pOuter == null || pInner == null then
13                  Continue
14               Plan p = OptJoin(pOuter, pInner)
15               Plan pOpt = optPlans[p.rel]
16               if (pOpt==null) PlanComparator(p, pOpt, ranking, c) then
17                  optPlans[p.rel] = p    // add plan
18    return optPlans[q];

---

The planner starts with leaf level plans, i.e., scans over each relation, and incrementally builds plans for two, three, and more relations. For each candidate outer and inner plans, the algorithm checks to see if it can prune the search space (Lines 10-13). Otherwise, a comparison is made (using the exploration comparator) regarding the best plan to join outer and inner, with the previous best seen before (Lines 14-16). Only if a better plan is found, it is added to the current best plans (Line 17). Finally, the best plan for the overall query is returned (Line 18).

In some embodiments, other query planners can be extended, such as a top-down query planner or a randomized query planner, to explore alternate join orders and eventually find the best join order. For example, a three-step template to convert a given query planner into an exploratory one is provided: (i) Enumerate: Iterate over candidate plans using the planner's enumeration strategy, e.g., bottom-up, top-down, (ii) Prune: Add pruning in the planner to discard subgraphs based on prior executions in the plan cache, i.e., subgraphs that were more expensive than the full query need not be explored anymore (e.g., this is in addition to any existing pruning in the planner), and (iii) Rank: Consider the number of new observations made when comparing and ranking equivalent plans. Additionally, costs can be incorporated by breaking ties using less expensive plans, or by considering observations only for plans with similar costs.

Execution Strategies

In some embodiments, one or more execution strategies can be employed with the system 100, the system 200, and/or the system 300, as discussed below.

Leveraging Recurring/Overlapping Jobs

Given the recurring and overlapping nature of production workloads, as described earlier, a natural strategy is to run multiple instances of subgraphs differently, i.e., apply the exploratory join ordering algorithm and get different plans for those instances. Furthermore, every instance of every subgraph run differently could be run until all alternative subgraphs have been explored, i.e., cardinality models for those alternate subgraphs have been learned and can pick the optimal join orders. Alternatively, since alternative subgraphs can be expensive, every other instance of every other subgraph run differently can be run to limit the number of outliers.

Static Workload Tuning

Instead of the above pay-as-you-go model for learning cardinality models for alternate subgraphs, queries can be tuned upfront by running multiple trials, each with different join ordering, over the same static data. As discussed below, proposed techniques can quickly prune down the search space, thereby making the number of trials feasible even for fairly complex jobs.

Reducing Exploration Overhead.

Since the actual costs of unseen subgraphs is unknown, exploratory join ordering can introduce significant runtime overheads. A typical technique to mitigate this is to perform pilot runs over a sample of the data. In some embodiments, similar sample runs can be used for resource optimization, i.e., for finding the best hardware resources for a given execution plan. Samples to learn cardinality models during static workload tuning can be used. For example, samples can be built using the traditional a priori sampling, or the more recent just-in-time sampling.

Feedback Loop

Referring back to FIG. 3, the system 300 can be used to learn cardinality models and generate predictions during query processing.

Workload Analyzer Component 210

In some embodiments, a first step in the feedback loop is to collect traces of past query runs from different components, namely the compiler component 110, the optimizer component 120, the scheduler component 140, and the runtime component 150. In some embodiments, the SCOPE infrastructure is already instrumented to collect such traces. These traces are then fed to the workload analyzer component 210 which (i) reconciles the compile-time and runtime statistics, and (ii) extracts the training data, i.e., subgraph templates and their actual cardinalities. In some embodiments, combining compile-time and run-time statistics requires mapping the logical operator tree to the data flow that is finally executed. To extract subgraphs, the logical operator tree can be traversed in a bottom-up fashion and emit a subgraph for every operator node. For each subgraph, the parameters are detected by parsing the scalar operators in the subgraph, and the leaf level inputs are detected by tracking the operator lineage. In some embodiments, a unique hash is used, similar to plan signatures or fingerprints, that is recursively computed at each node in the operator tree to identify the subgraph template. In some embodiments, the leaf level inputs and the parameter values are excluded from the computation as subgraphs that differ only in these attributes belong to the same subgraph template. Finally, in some embodiments, for each subgraph, the features discussed above are extracted and together with the subgraph template hash they are sent to the trainer component 220.

Trainer Component 220

In some embodiments, given that a large number of subgraph templates can be involved, and the model trained from one subgraph template is independent of others, the trainer component 220 can implement a parallel model trainer that can significantly speed up the training process. In particular, in some embodiments, SCOPE can be used to partition the training data for each subgraph template, and build the cardinality model for each of them in parallel using a reducer. Within each reducer, a machine learning algorithm can be used to train the model. For example, the machine learning algorithm can include a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, and/or a Gradient Boost & Adaboost algorithm. In some embodiments, in addition to the model, the reducer also emits the training error and the prediction error for the ten-fold cross validation. The reducer can also be configured to group these statistics by the type of the root operator of the subgraph template. This can help in an investigation of which type of subgraph template model is more effective compared to the optimizer's default estimation. The trained models are stored in the model server component 130.

Model Server Component 130

In some embodiments, the model server component 130 is responsible for storing the models trained by the trainer component 220. In some embodiments, for each subgraph hash, the model server component 130 keeps track of the corresponding model along with its priority level and confidence level. In some embodiments, priority level is determined by how much improvement this model can achieve compared to the optimizer's default estimation. In some embodiments, confidence level is determined by the model's performance on a ten-fold cross validation. In some embodiments, the models with high priority levels can be cached into the database to improve the efficiency of model lookup. Note that in some embodiments, caching substantially all models into the database can be impractical due to limited storage resources. Since SCOPE job graphs can have hundreds of nodes and hence hundreds of cardinality models, in some embodiments, the model server component 130 can build an inverted index on the job metadata (which often remains the same across multiple instances of a recurring job) to return relevant cardinality models for a given job in a single call.

Model Lookup & Prediction

The compiler component 110 and the optimizer 120 are responsible for model lookup and prediction. First, in some embodiments, the compiler component 110 fetches relevant cardinality models for the current job and passes them as annotations to the optimizer component 120. In some embodiments, each annotation contains the subgraph template hash, the model, and the confidence level. Thereafter, in some embodiments, the optimizer component 120 prunes out the false positives by matching the subgraph template hash of the model with the hashes of each subgraph in the job graph. For matching subgraphs, the optimizer component 120 generates the features and applies them to the corresponding model to obtain the predicted cardinality. In some embodiments, the compiler component 110 and/or the optimizer component 120 can prune models with sufficiently low confidence level. In addition, in some embodiments, any row count hints from the user (in their job scripts) can still supersede the predicted cardinality values. Finally, in some embodiments, predicted cardinalities can also persisted into the query logs for use during debugging, if needed.

Retraining

In some embodiments, the cardinality models can be retrained for different reasons: (i) applying cardinality predictions results in new plans which means new subgraph templates, and hence the cardinality models need to be retrained until the plans stabilize, and (ii) the workloads can change over time and hence many of the models are not applicable anymore. Therefore, in some embodiments, periodic retraining of the cardinality models is performed to update existing models as well as adding new ones. In some embodiments, the timing of retraining can be performed based on the cardinality model coverage, i.e., the fraction of the subgraphs and jobs for which the models are available. Retraining can occur when those fractions fall below a predetermined threshold. In some embodiments, based upon experimental data, one month is a reasonable time to retrain the cardinality models.

Exploration

In some embodiments, exploratory join ordering executes alternate subgraphs that can be potentially expensive. In some embodiments, human(s) (e.g., users, admins) can be involved with production workload(s) in order to manage cost expectations. In some embodiments, the exploratory join ordering algorithm can be run separately to produce a next join order given the subgraphs seen so far. User(s) can then enforce the suggested join order using the FORCE ORDER hint in their job scripts, which is later enforced by the SCOPE engine during optimization. Users can apply these hints to their recurring/overlapping jobs, static tuning jobs, or pilot runs over sample data.

Experimental Results

An experimental evaluation of an exemplary feedback loop architecture 300 over a same dataset as discussed above (e.g., one day's worth of jobs comprising tens of thousands of jobs) is presented. For this experimental evaluation, the goals of the evaluation are four-fold: (i) to evaluate the quality of the learned cardinality models, (ii) to evaluate the impact of a feedback loop on the query plans, (iii) to evaluate the improvements in performance and resource consumption, and (iv) to evaluate the effectiveness of exploratory query planning.

Model Evaluation

The training accuracy, cross-validation, and coverage of the learned cardinality models of the exemplary feedback loop architecture 300 are first evaluated.

Training

Figure 9A:
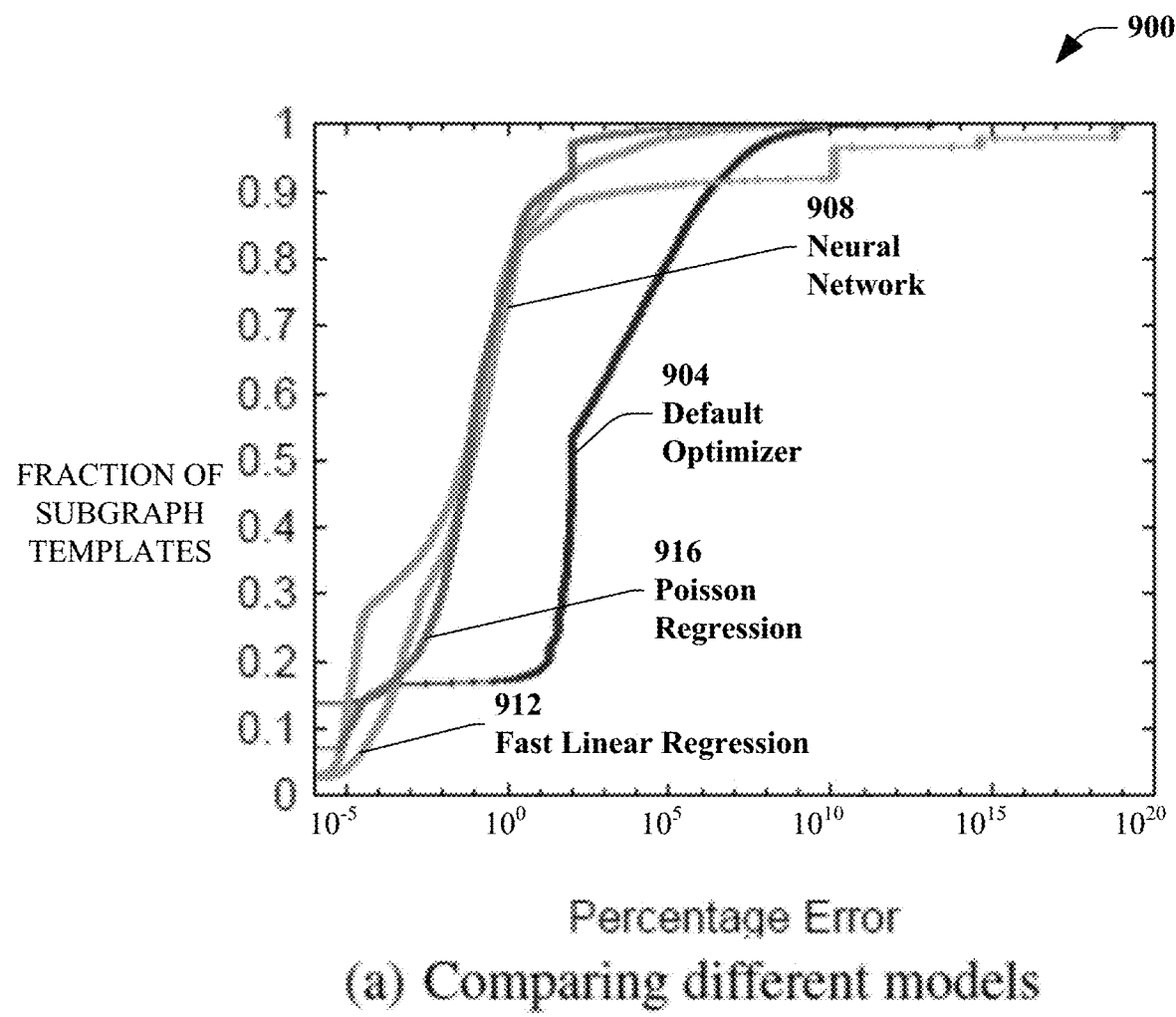
FIGS. 9(A)-9(C) are graphs that illustrate cardinality model training results of the exemplary feedback loop architecture.
Figure 9B:
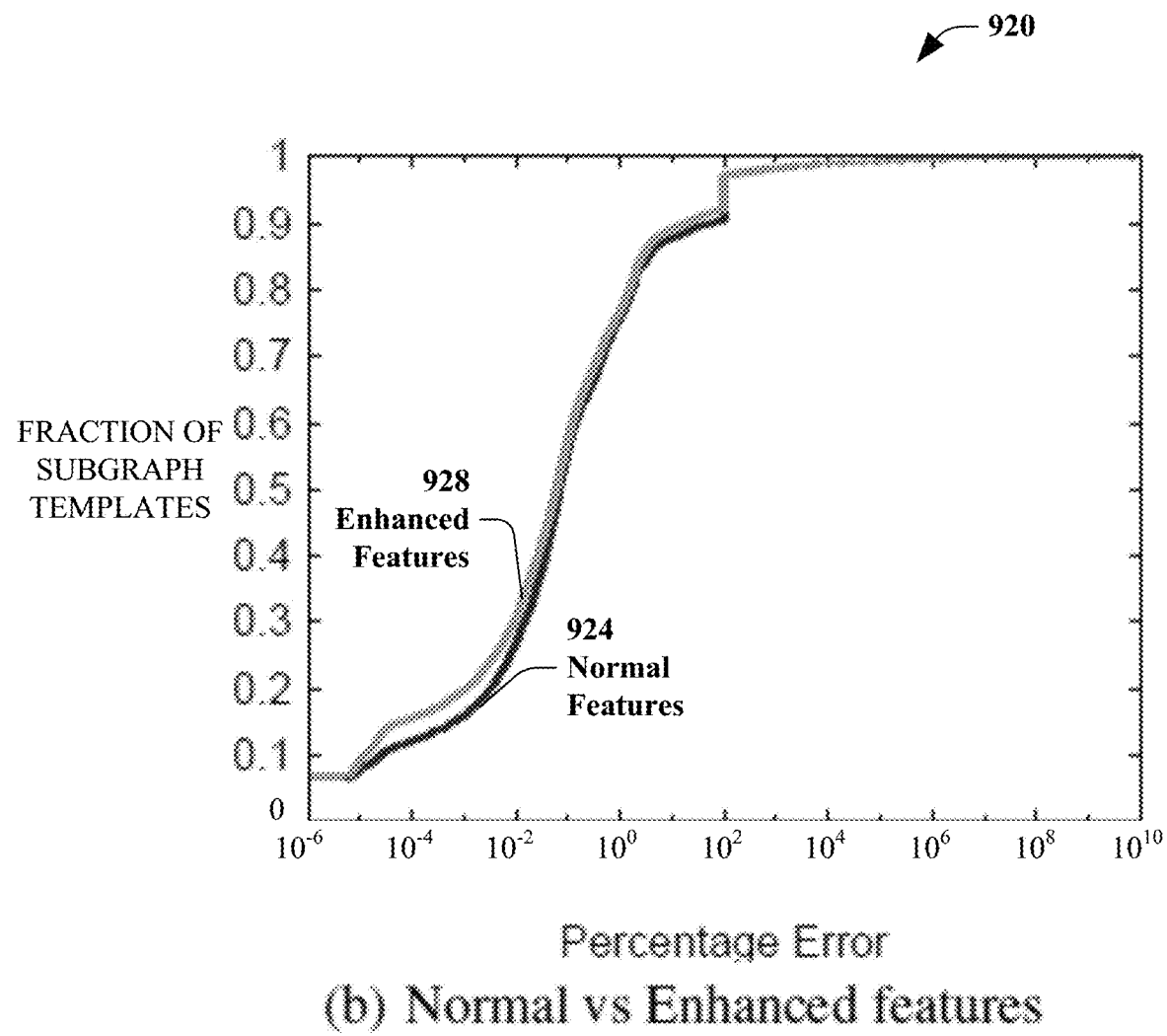
Figure 9C:
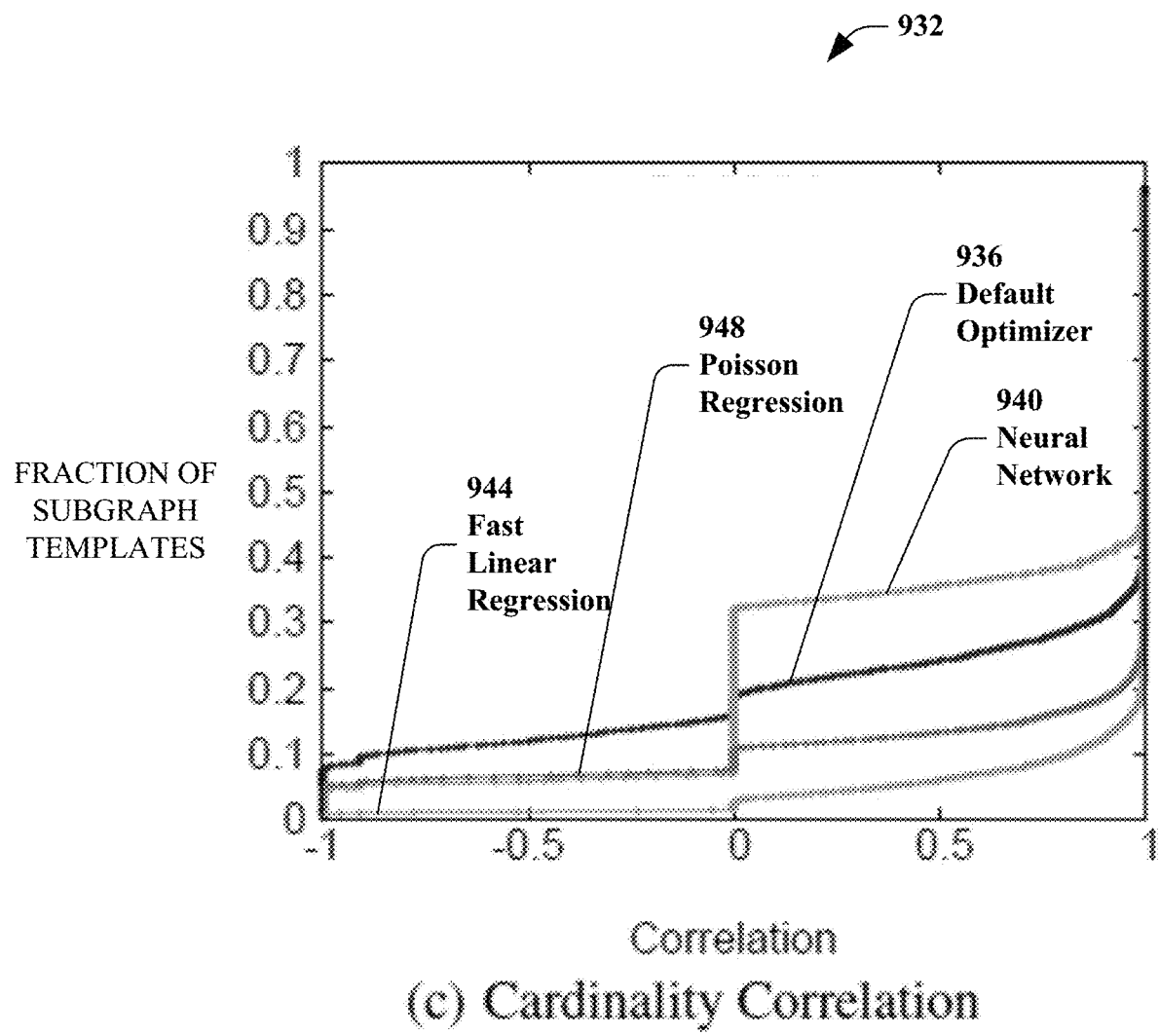

FIGS. 9(A)-9(C) illustrate cardinality model training results of the exemplary feedback loop architecture. FIG. 9(A) is a graph 900 illustrating a comparison of percentage error vs. fraction of subgraph templates for a default optimizer 904, a multi-layer perceptron neural network 908, a fast linear regression 912 and Poisson regression 916. FIG. 9(A) shows the results over 34,065 subgraph templates. The prediction error from the optimizer's default estimation is included as a baseline comparison 904. For 90% of the subgraph templates, the training error of all three models (multi-layer perceptron neural network 908, fast linear regression 912, and Poisson regression 916) is less than 10%. For the baseline 904, however, only 15% of the subgraph templates achieve the same level of performance. Therefore, the learning models significantly outperform the baseline.

FIG. 9(B) is a graph 920 illustrating the effect of using the enhanced features on the prediction accuracy. The graph 920 includes a distribution of normal features 924 and a distribution of enhanced features 928. The enhanced features 928 include the square, square root, and log of input cardinality discussed above in order to account for operators that can lead to a non-linear relationship between the input and output cardinality. It is observed that adding these features does lead to a slight performance improvement in terms of the training accuracy. More importantly, as discussed below, the enhanced features can lead to new query plan generations when feeding back cardinalities produced by our model.

FIG. 9(C) is a graph 932 illustrating the Pearson correlation between the predicted cardinality and the actual cardinality for different models. The graph 932 includes a default optimizer distribution 936, a multi-layer perceptron neural network distribution 940, a fast linear regression distribution 944 and a Poisson regression distribution 948. It can be observed that fast linear regression and Poisson regression manage to achieve higher correlation than the baseline default optimizer. Surprisingly, although a neural network attains a very low training error, the correlation between its predicted cardinality and the actual cardinality is lower than the baseline.

Figure 10A:
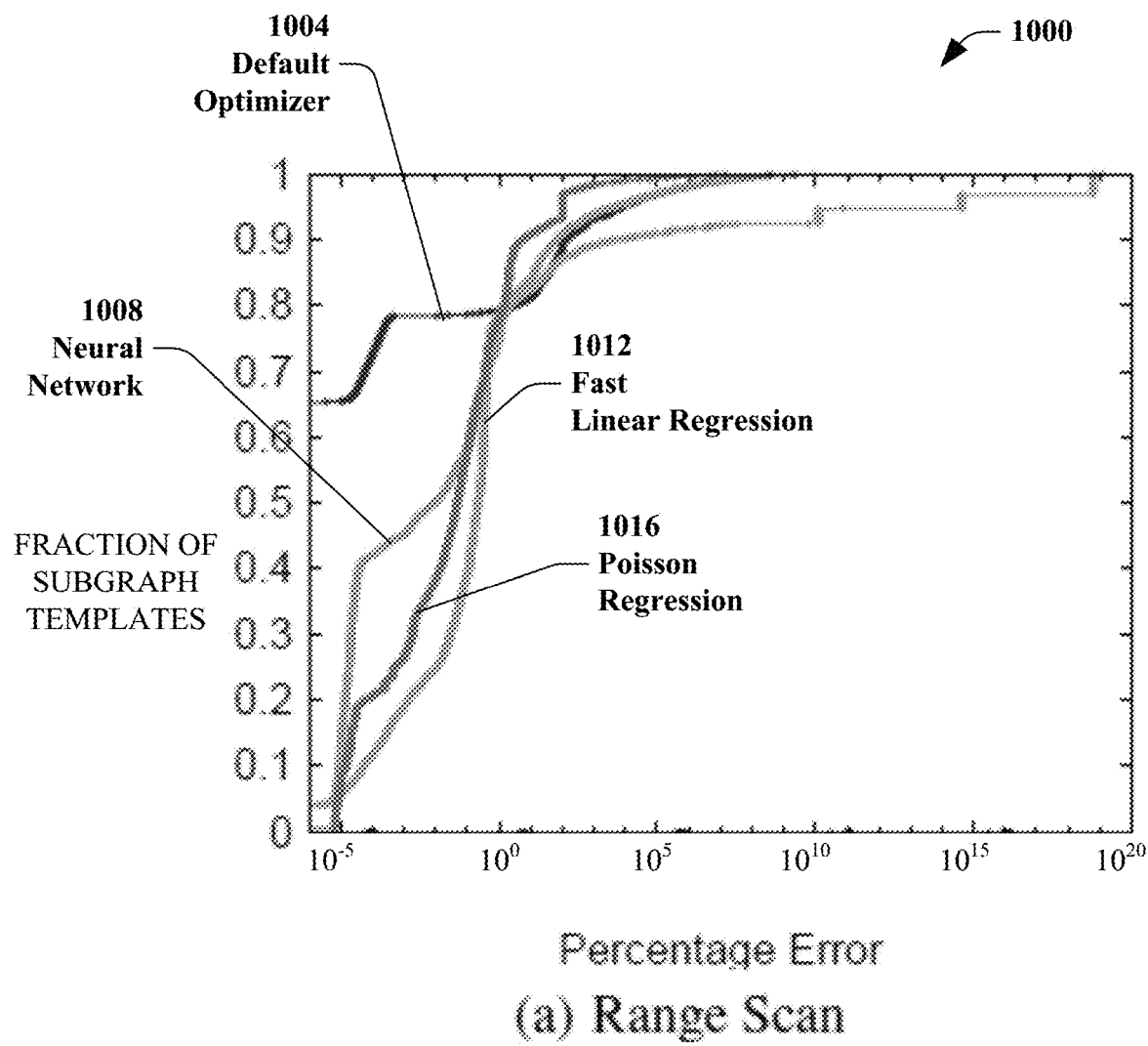
FIGS. 10(A)-10(C) are graphs that illustrate training error.
Figure 10B:
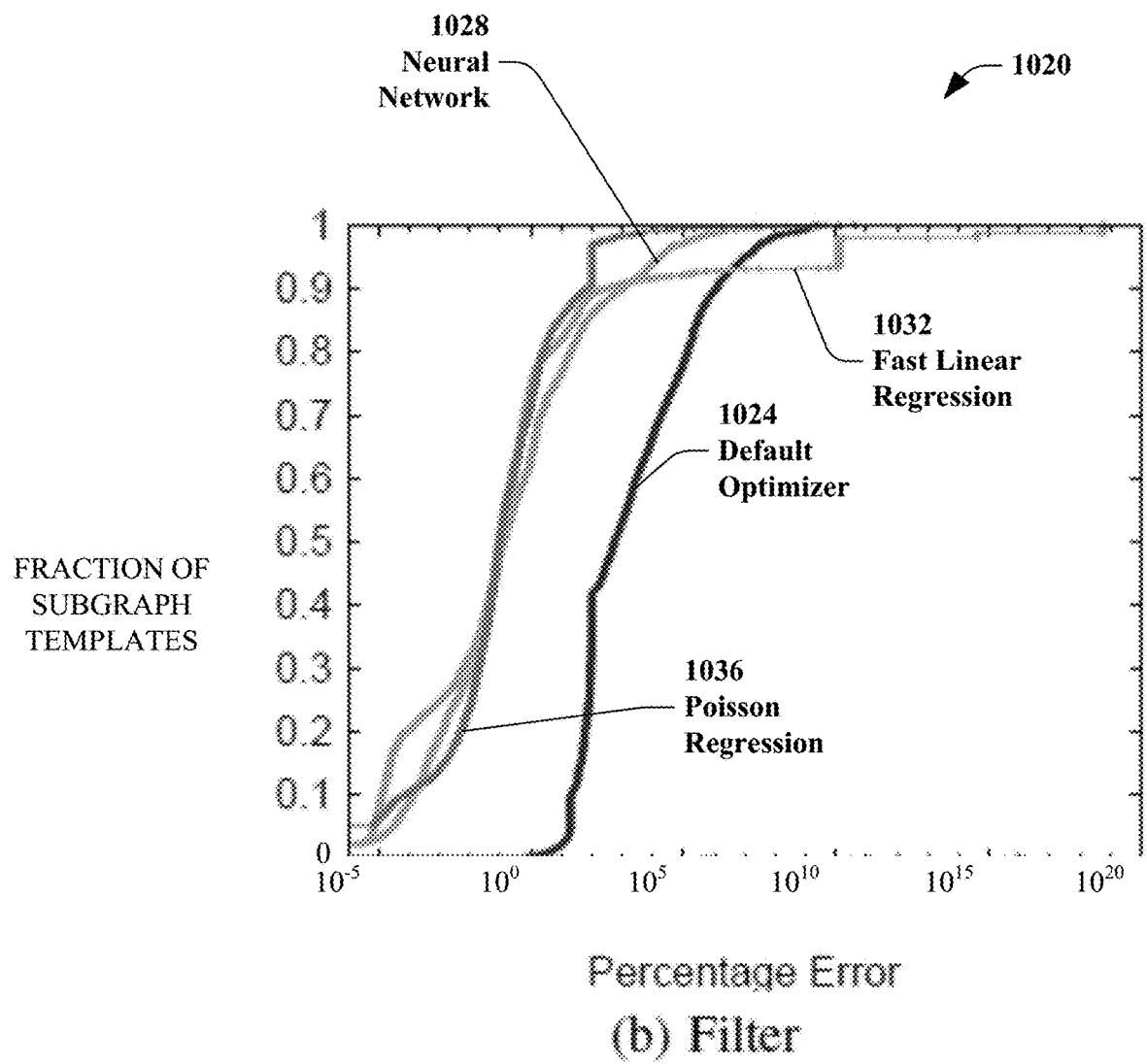
Figure 10C:
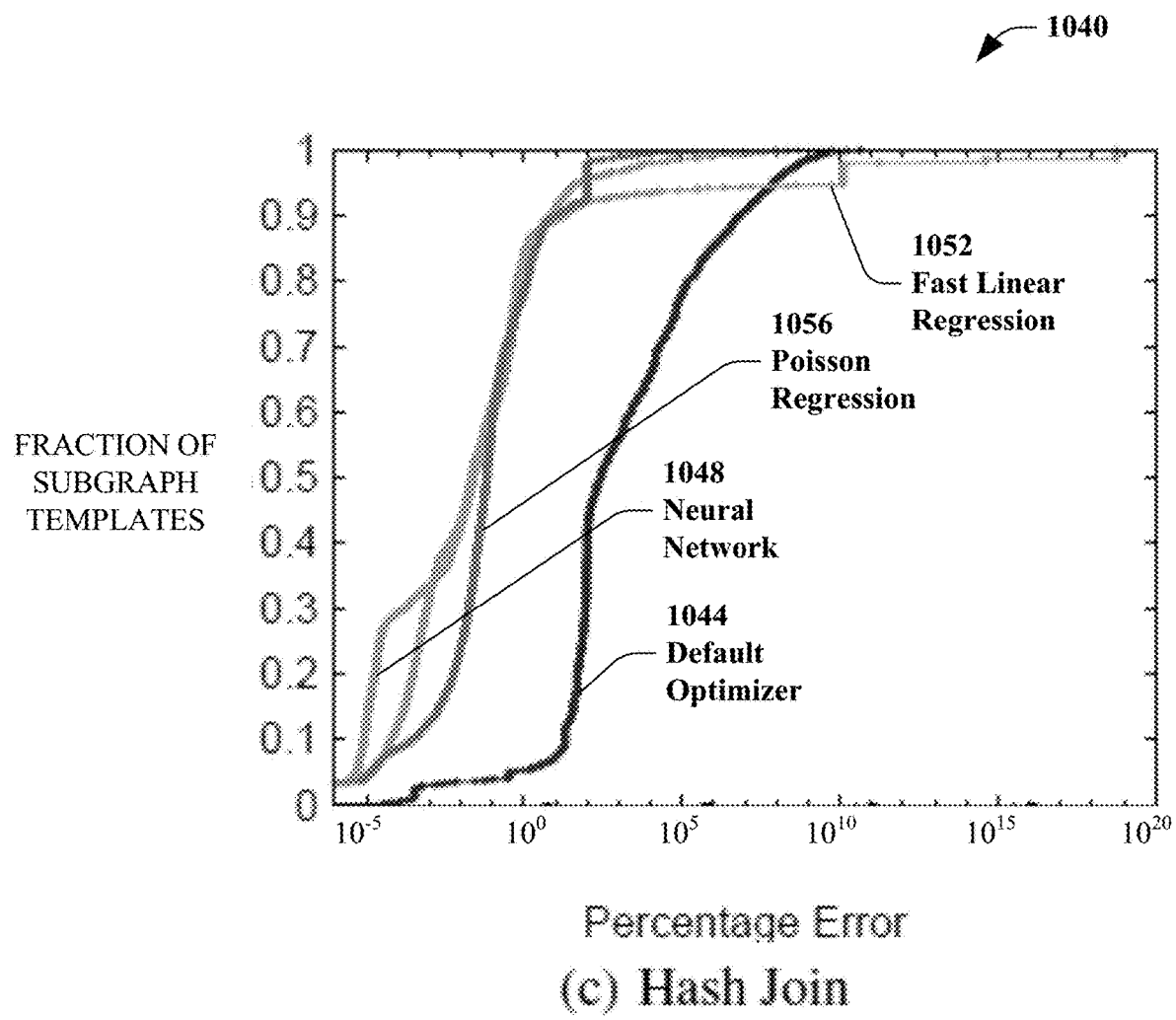

In order to study the impact of the root operator on the quality of cardinality estimation, the subgraph templates can be grouped by the type of their root operator. FIGS. 10(A)-10(C) illustrate the training error of the exemplary models and the baseline on subgraph templates whose root operators are range scan, filter, and hash join.

FIG. 10(A) is a graph 1000 that includes a default optimizer distribution 1004, a multi-layer perceptron neural network distribution 1008, a fast linear regression distribution 1012 and a Poisson regression distribution 1016. FIG. 10(B) is a graph 1020 that includes a default optimizer distribution 1024, a multi-layer perceptron neural network distribution 1028, a fast linear regression distribution 1032 and a Poisson regression distribution 1036. FIG. 10(C) is a graph 1040 that includes a default optimizer distribution 1044, a multi-layer perceptron neural network distribution 1048, a fast linear regression distribution 1052 and a Poisson regression distribution 1056.

It can be observed that for a range scan as illustrated in FIG. 10(A), the default optimizer's estimation 1004 (baseline performance) is in fact comparable to the exemplary models 1008, 1012, 1016. For the other two operators, however, the exemplary models 1008, 1012, 1016 perform significantly better than the baseline 1004. Thus, in some embodiments, some models are more important than others as they can provide far more accurate cardinality estimation than using the baseline. Therefore, in some embodiments, this information can assist in the decision of which model to materialize when a limited storage budget is involved.

Cross-Validation

Figure 11A:
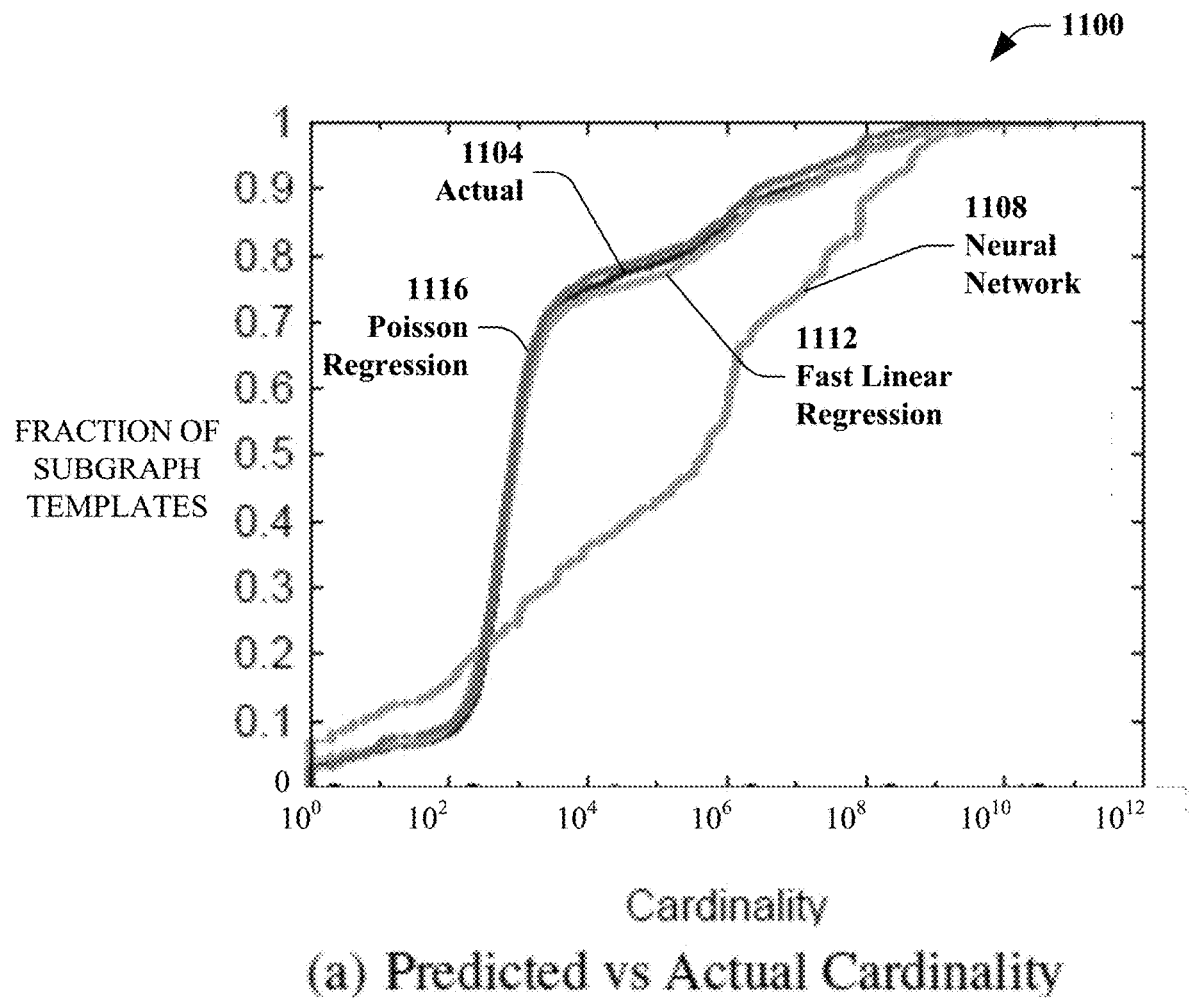
FIGS. 11(A)-11(C) are validation graphs.

Different models can be compared over ten-fold cross validation. FIG. 11(A) is a validation graph 1100 that includes an actual distribution 1104, a multi-layer perceptron neural network distribution 1108, a fast linear regression distribution 1112 and a Poisson regression distribution 1116. FIG. 11(A) illustrates the cumulative distributions of predicted and actual cardinalities. It can be observed that both fast linear 1112 and Poisson regression 1116 follow the actual cardinality distribution 1104 very closely.

Figure 11B:
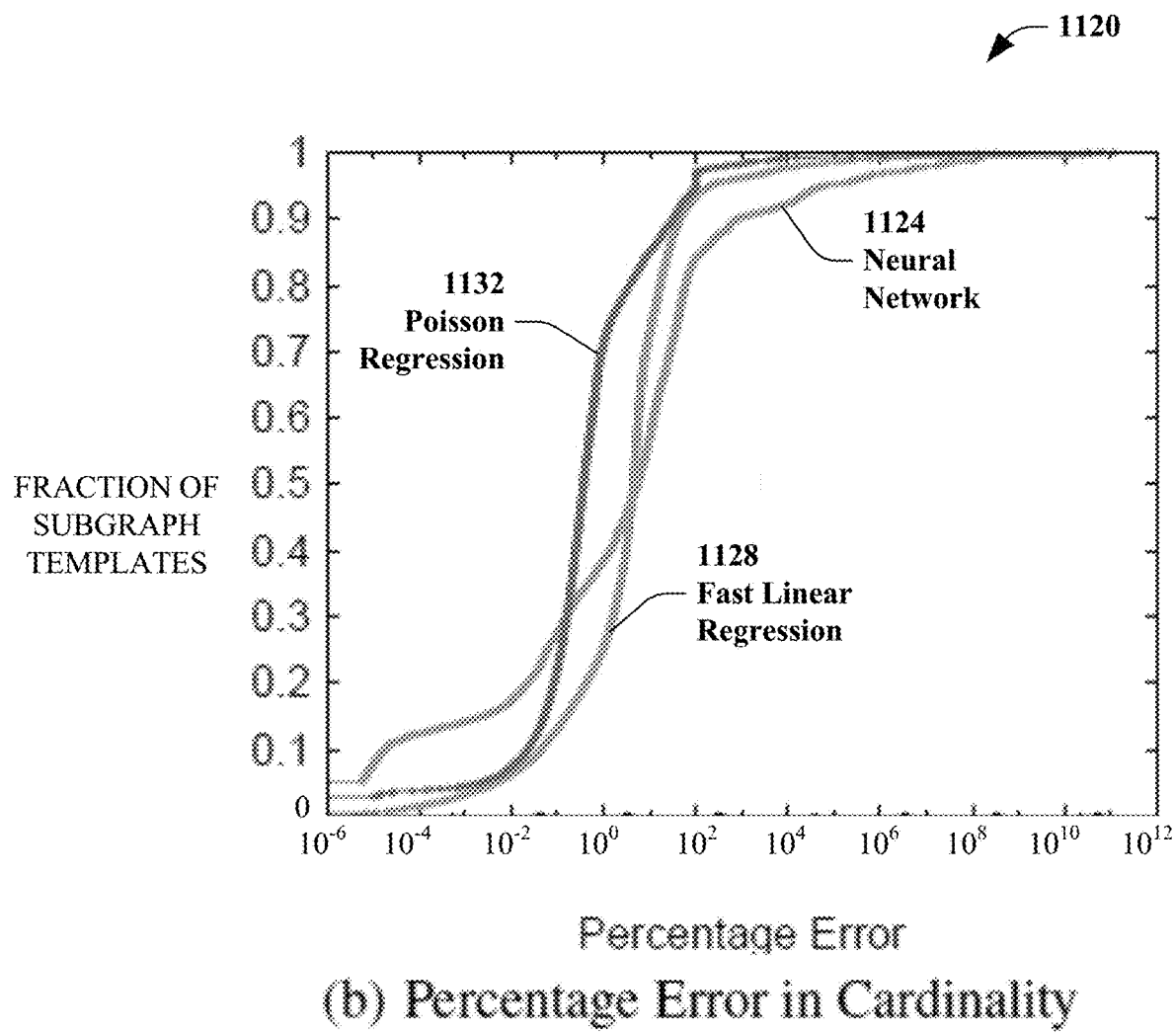

FIG. 11(B) is a validation graph 1120 that includes a multi-layer perceptron neural network distribution 1124, a fast linear regression distribution 1128 and a Poisson regression distribution 1132. FIG. 11(B) illustrates the percentage error of different prediction models 1124, 1128, 1132. In this example, Poisson regression 1132 has the lowest error, with 75th percentile error of 1.5% and 90th percentile error of 32%. This is compared to 75th and 90th percentile errors of 74602% and 5931418% respectively for the default SCOPE optimizer. While the neural network 1124 achieves the smallest training error, it exhibits the largest prediction error when it comes to cross-validation. This is likely due to overfitting given the large capacity of the neural network and the relatively small observation space and feature space, as also discussed above.

Figure 11C:
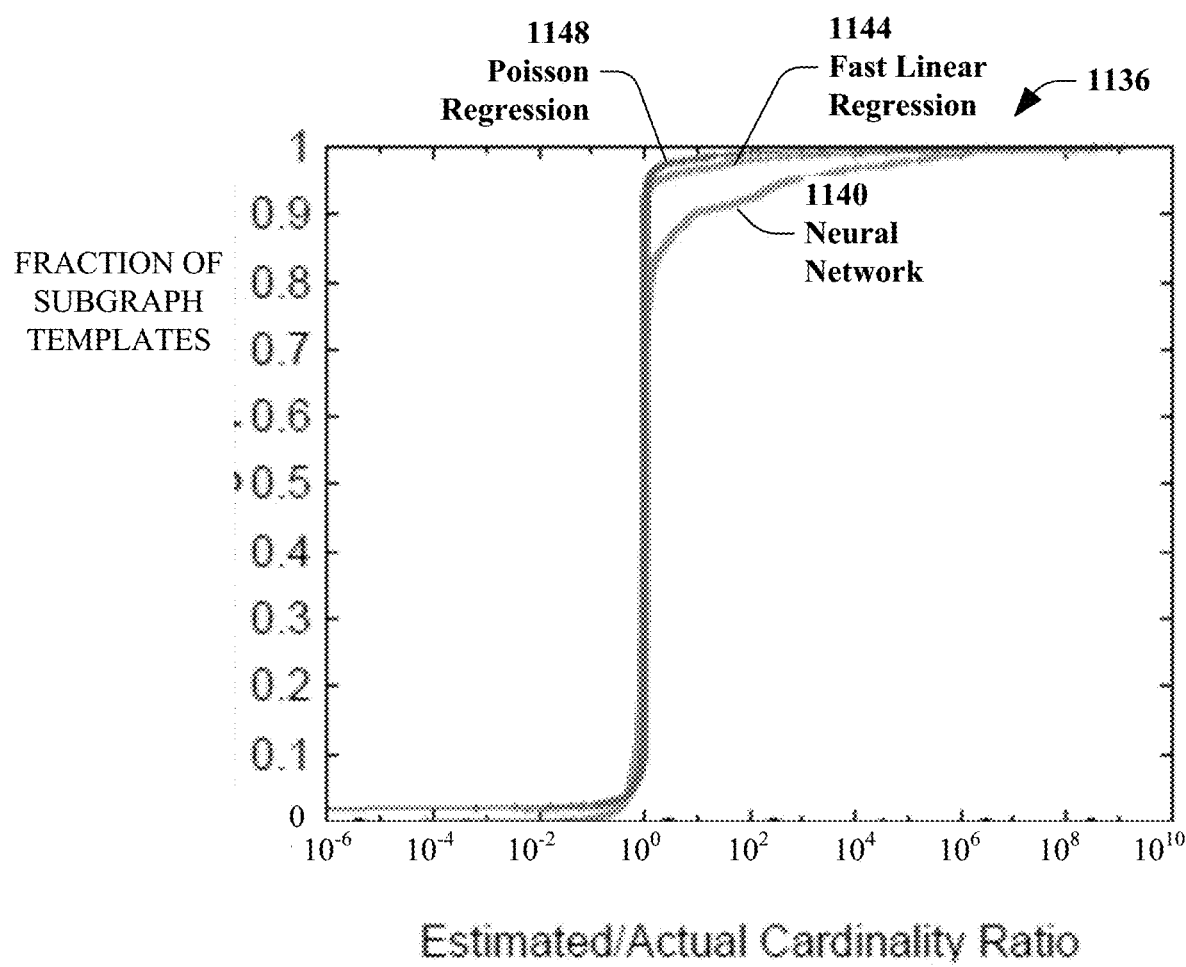

Lastly, FIG. 11(C) is a graph 1136 that includes a multi-layer perceptron neural network distribution 1140, a fast linear regression distribution 1144 and a Poisson regression distribution 1148. FIG. 11(C) illustrates the ratio between the model's 1140, 1144, 1148 predicted cardinality and the actual cardinality for each subgraph. It can be observed that the ratio is very close to 1 for most of the subgraphs across all three models 1140, 1144, 1148. Compared to fast linear regression 1144 and Poisson regression 1148, it can be observed that neural network 1140 overestimates 10% of the subgraphs by over 10 times. This may be due to the aforementioned overfitting. Nevertheless, compared to the FIG. 4(B) generated using the optimizer's estimation, all of the models 1140, 1144, 1148 achieve significant improvement.

Coverage

Figure 12A:
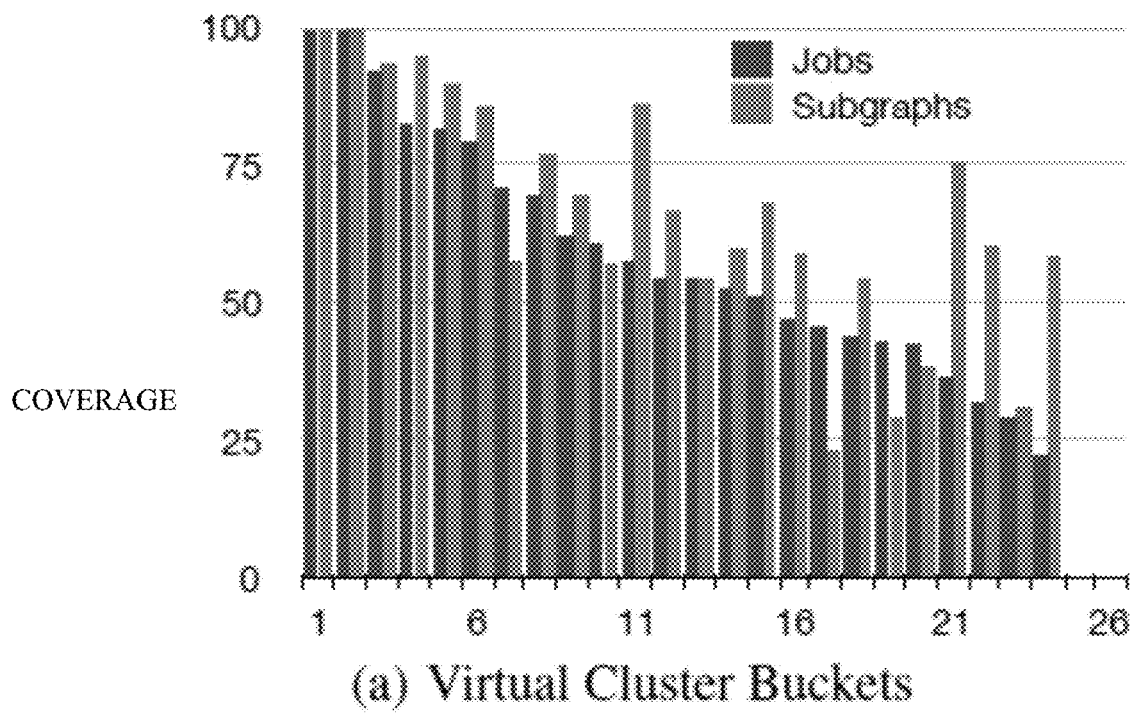
FIGS. 12(A)-12(C) are bar charts illustrating coverage.
Figure 12B:
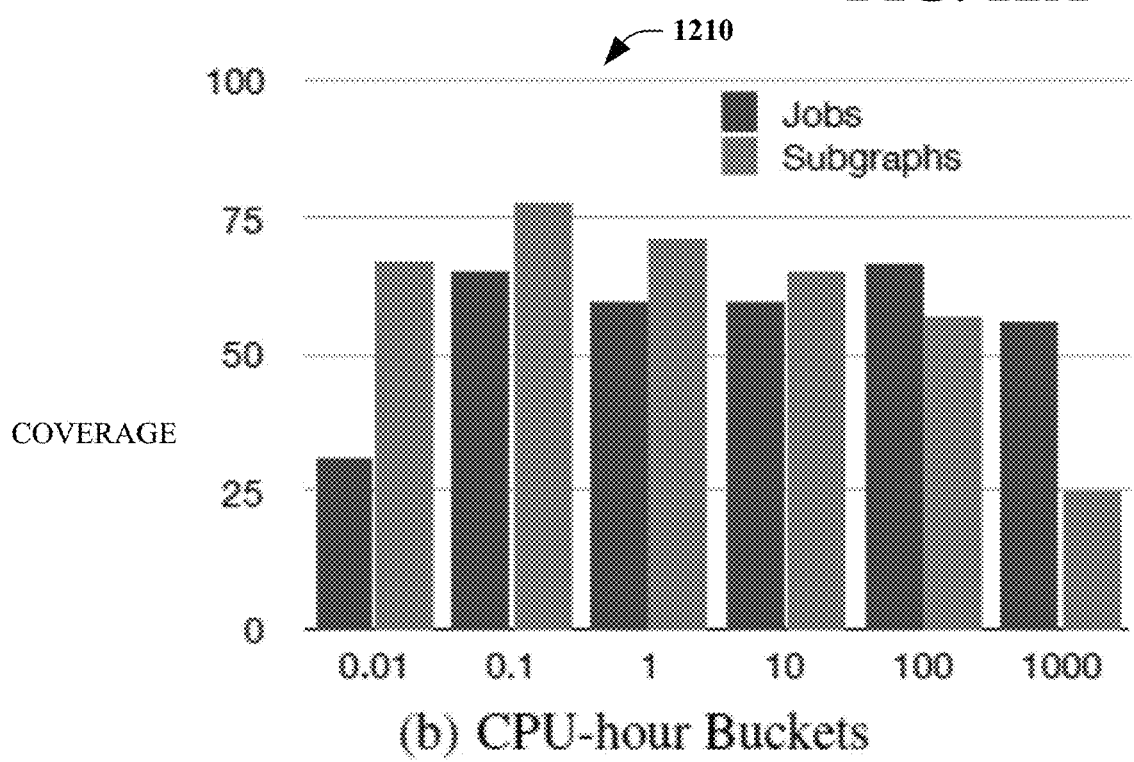
Figure 12C:
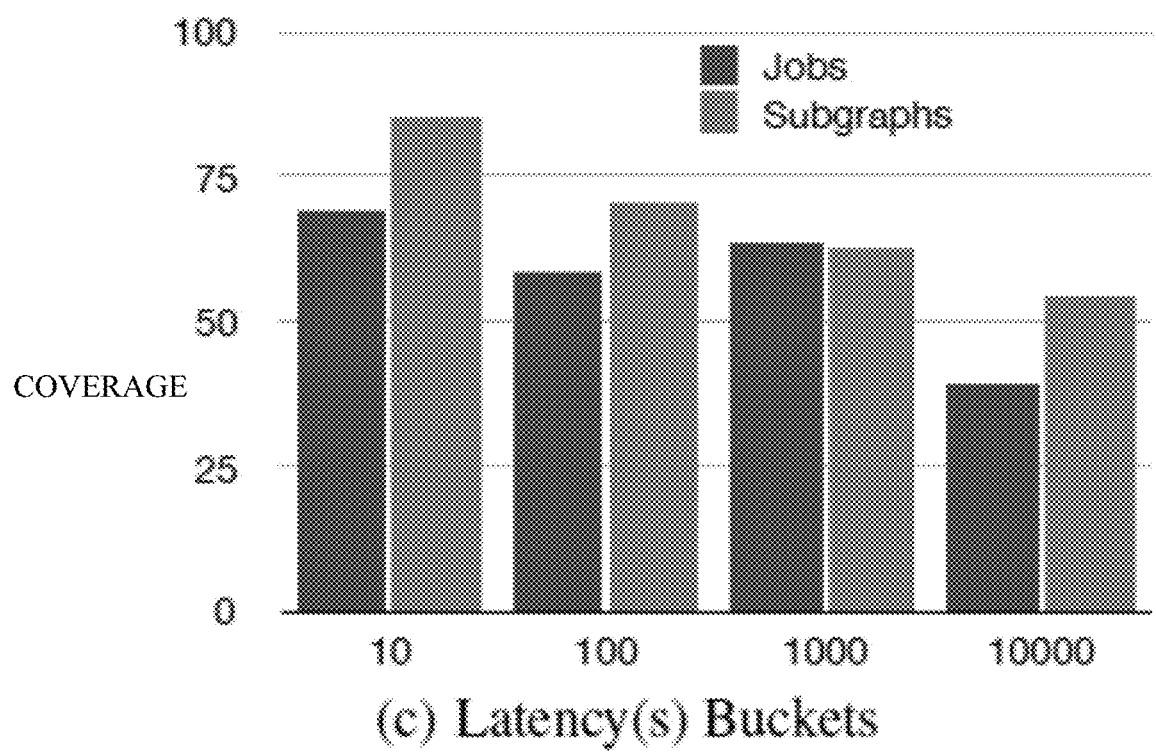

The coverage of the cardinality feedback is now evaluated. In some embodiments, the subgraph coverage can be defined as the percentage of subgraphs having a learned model and the job coverage as percentage of jobs having a learned cardinality model for at least one subgraph. FIG. 12(A) is a bar chart 1200 illustrating the coverage for different virtual clusters (VCs)–58 (77%) VCs have at least 50% jobs (subgraphs) impacted. The jobs/subgraphs are further subdivided into CPU-hour and latency buckets and the coverage evaluated over different buckets. FIGS. 12(B) and 12(C) are bar charts 1210, 1220 illustrating the results. Interestingly, the fraction of subgraphs impacted decreases both with larger CPU-hour and latency buckets. In some embodiments, this is because there are a fewer number of jobs in these buckets and hence less overlapping subgraphs across jobs. Still more than 50% of the jobs are covered in the largest CPU-hour bucket and almost 40% are covered in the largest latency bucket.

Figure 13A:
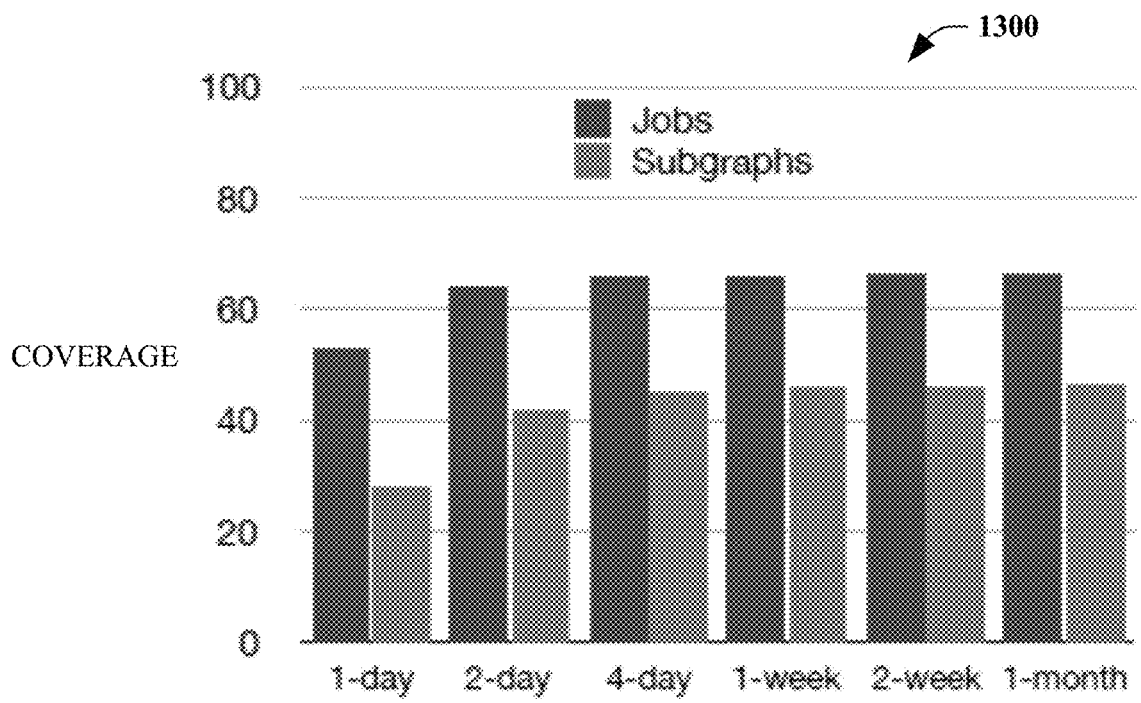
FIGS. 13(A)-13(C) are bar charts illustrated coverage.
Figure 13B:
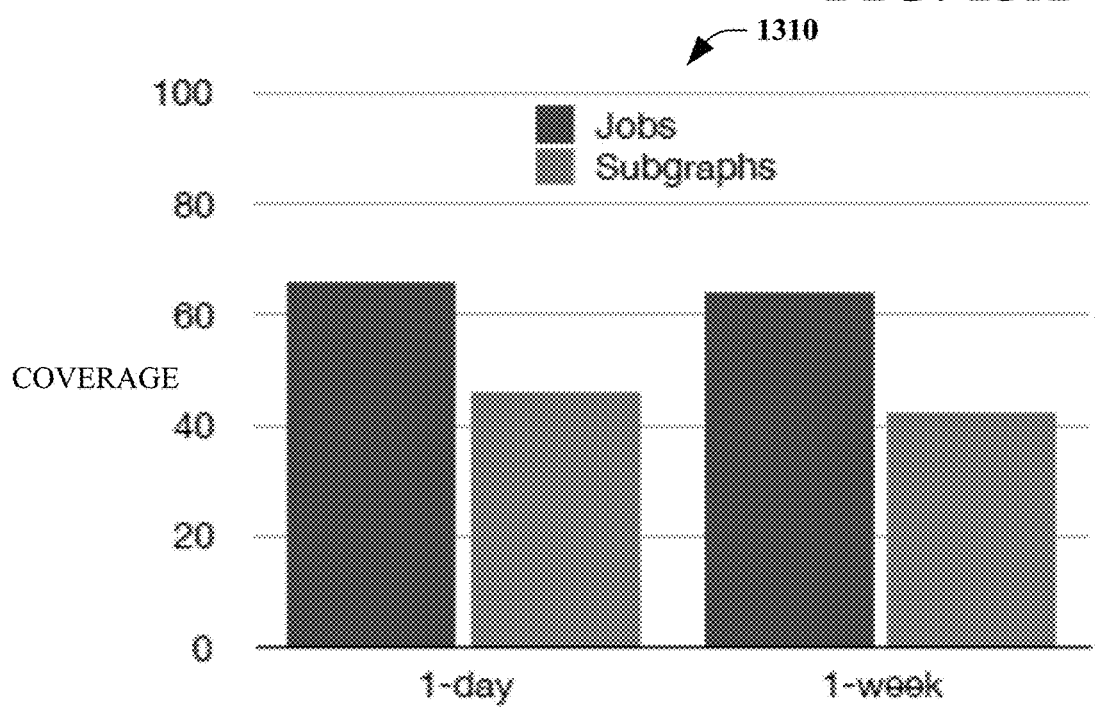
Figure 13C:
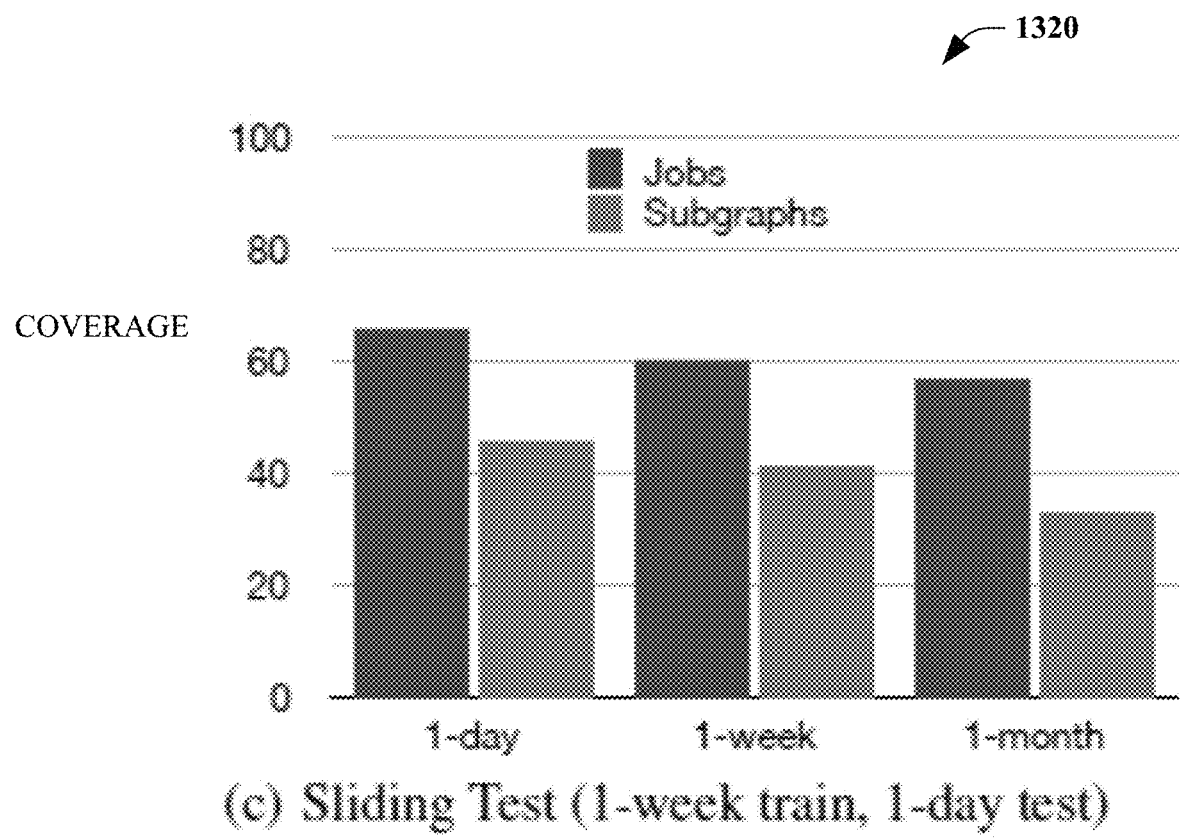

Next, how the coverage changes as the training and testing duration are varied is evaluated. FIG. 13(A) is a bar chart 1300 that illustrates the coverage over varying training durations from one day to one month and testing one day after. It can be observed that two-day training already brings the coverage close to the peak (45% subgraphs and 65% jobs). In some embodiments, this is because most of the workload comprises daily jobs and a two-day window captures jobs that were still executing over the day boundary. This is further reflected in the bar chart 1310 of FIG. 13(B), where the coverage remains unchanged when the test window is varied from a day to a week. Finally, the one-day testing window is slid by a week and by a month in the bar chart 1320 of FIG. 13(C). In some embodiments, it can be observed that the coverage drop is noticeable when testing after a month, indicating that this is a good time to retrain in order to adapt to changes in the workload.

Plan Evaluation

In this section, how the cardinality models affect the query plans generated by the optimizer is evaluated. The same workload that was used to train the models, as discussed above, is replayed, and cardinalities predicted wherever possible using the learned models.

First, the percentage of jobs whose query plan change after applying our models is computed. This is important for two reasons: (i) change in query plan usually implies generation of new subgraphs templates, which could be used for further training and improving coverage, and (ii) the new query plan has the potential to significantly improve the performance. The bar chart 1400 includes an enhanced multi-layer perceptron neural network bar 1404, an enhanced Poisson regression bar 1408, an enhanced fast linear regression bar 1412, a multi-layer perceptron neural network bar 1416, a Poisson regression bar 1420 and a fast linear regression bar 1424.

Figure 14A:
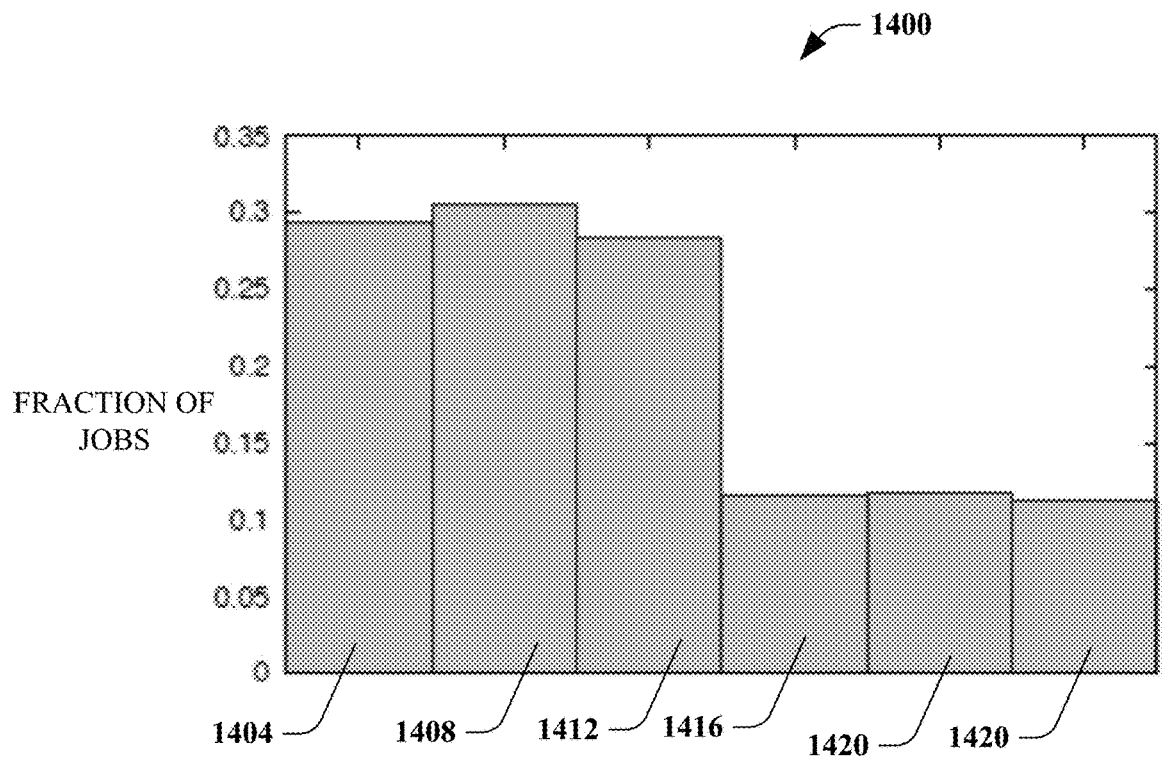
FIG. 14(A) is a bar chart illustrating training of cardinality models using standard features.

The bar chart 1400 of FIG. 14(A) shows that when training models using standard features, on an average, only 11% of the jobs experience changes in query plans. However, once the enhanced features are incorporated into the models, these percentages go up to 28%. This is because the enhanced features capture the non-linear relationships between the input and output cardinality and are significant to the model performance. Overall, it can be observed that applying the models yield significant changes to the optimizer's generated query plans.

Figure 14B:
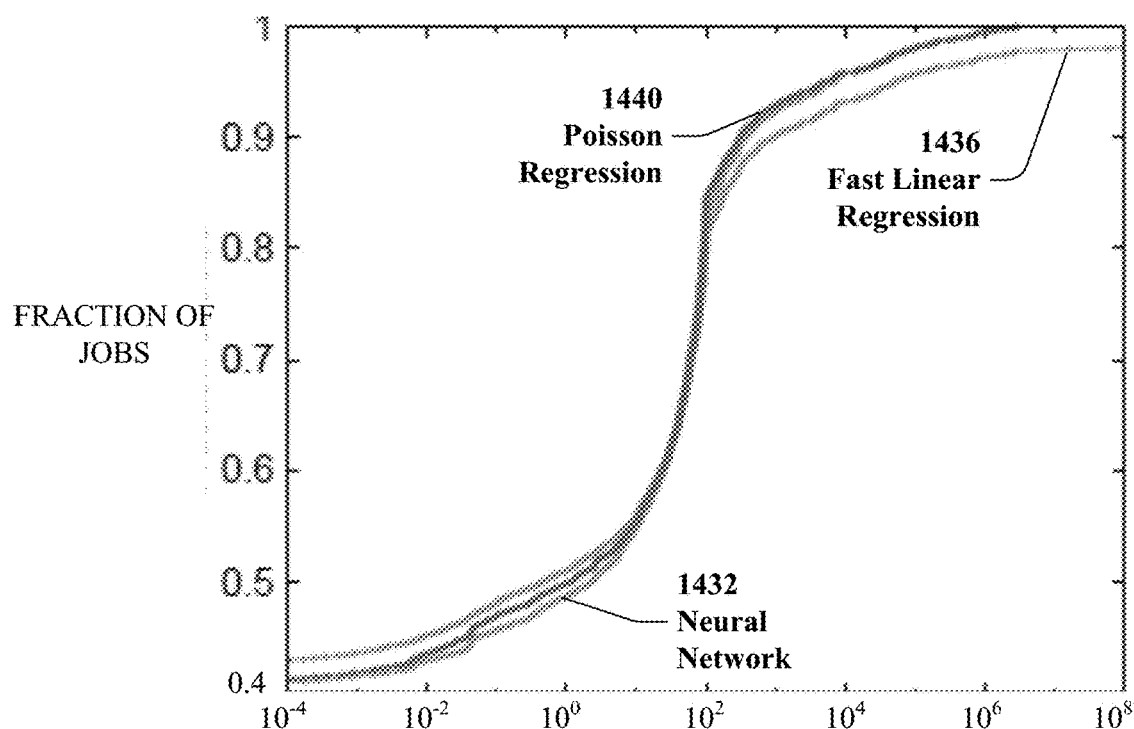
FIG. 14(B) is a graph illustrating distributions of percentage plan cost change.

Next, the percentage query plan cost change before and after applying our models to the jobs in the workload is computed. The results showed 67% of the jobs having cost reduction of more than 1e-5, and 30% of the jobs having cost increase of more than 1e3. FIG. 14(B) is a graph 1428 that includes a multi-layer perceptron neural network distribution 1432, a fast linear regression distribution 1436 and a Poisson regression distribution 1440. FIG. 14(B) illustrates the absolute change for all three models 1432, 1436, 1440. It can be observed that a 75th percentile cost change of 79% and 90th percentile cost change of 305%. Thus, the high accuracy cardinality predictions from the models (FIG. 11(C)) do indeed impact and rectify the estimated costs significantly.

Figure 14C:
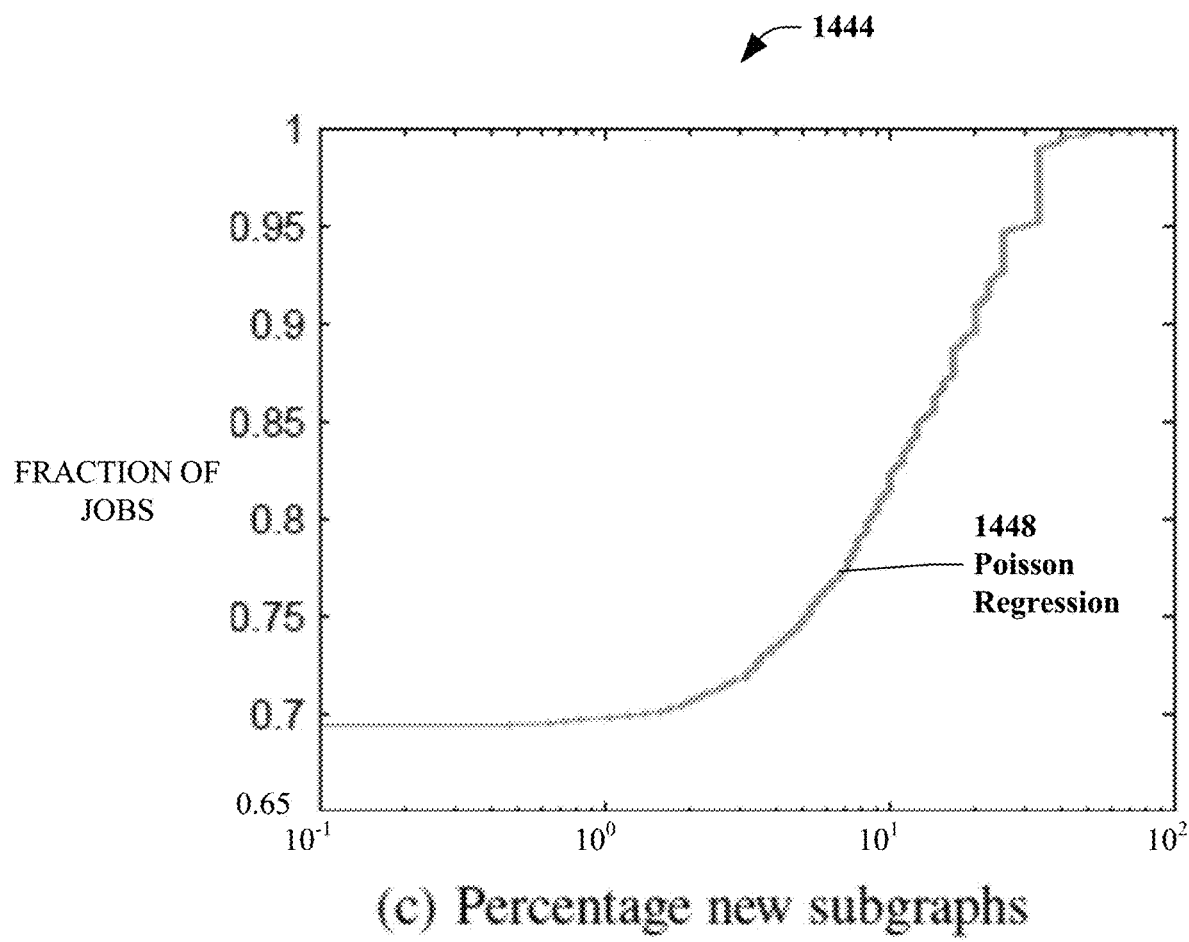
FIG. 14(C) is a graph illustrating a distribution of percentage new subgraphs in recompiled jobs due to improved cardinalities.

Finally, to understand the changes to the query plans, FIG. 14(C) is a graph 1444 that includes a distribution 1448 illustrating the percentage new subgraphs generated in the recompiled jobs due to improved cardinalities. For Poisson regression which was seen, to be the best earlier, it can be observed that a 75th percentile cost change of 5% and 90th percentile cost change of 20%, indicating that the cost changes indeed lead to newer and better query plans for execution.

Performance Evaluation

The performance improvement when using the feedback loop of learned models is next evaluated. In some embodiments, three items can be considered for the evaluation: (i) the end-to-end latency which indicates the performance visible to the user, (ii) the CPU-hours which indicates the cost of running the queries in a job service, and (iii) the number of containers (or vertices) launched which indicates the resource consumption. Eight different production recurring jobs were selected, each of which get executed multiple times in a day and having default end-to-end latency within 10 minutes. These jobs were executed with and without feedback by directing the output to a particular location. In some embodiments, the opportunistic scheduling was disabled to make the measurements from different queries comparable.

Figure 15A:
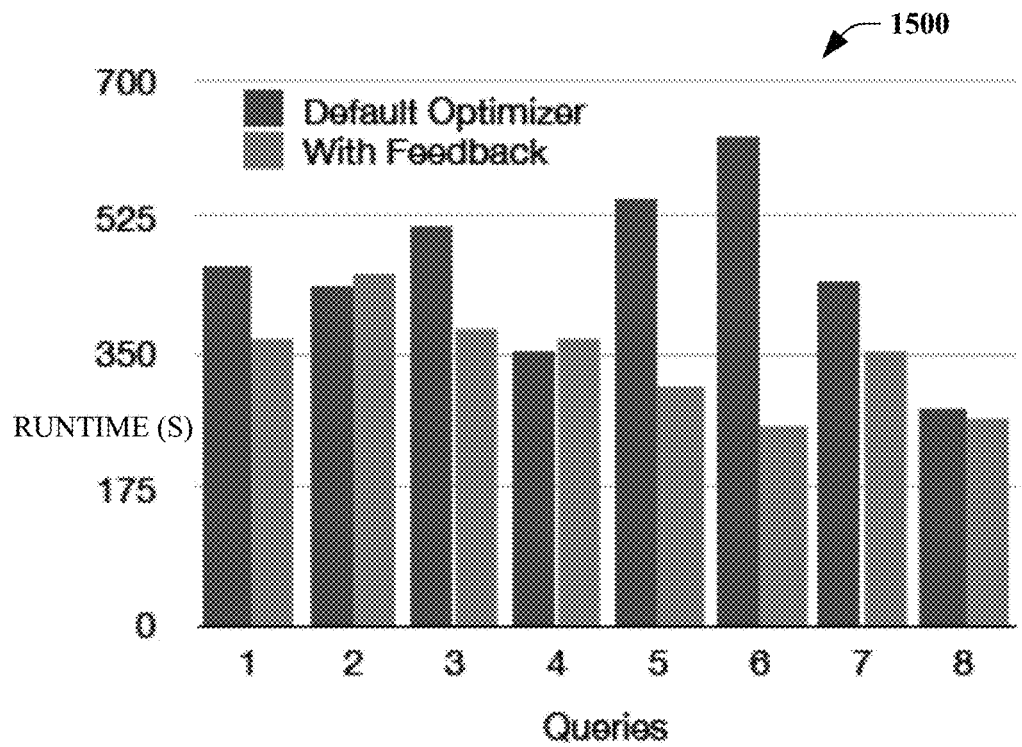
FIG. 15(A) is a bar chart that illustrates the end-to-end latencies of each of the queries with and without the feedback loop.

FIG. 15(A) is a bar chart 1500 that illustrates the end-to-end latencies of each of the queries with and without the feedback loop. It can be observed that the latency improvement is variable and sometimes it is simply not there (queries 2, 4, and 8). This is because latency improvements depend on whether or not the changes in the plan are on the critical path. Still, a 25% improvement in total latency can be observed, which is valuable for improving user experience on SCOPE.

Figure 15B:
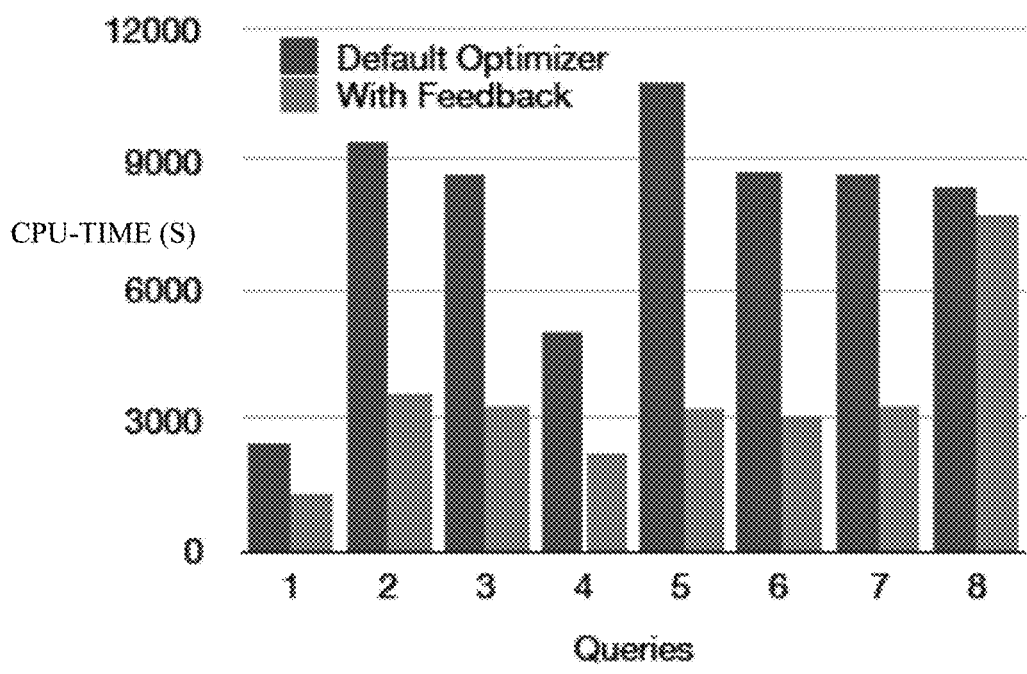
FIG. 15(B) is a bar chart that compares the CPU-hours of queries with and without the feedback loop.

FIG. 15(B) is a bar chart 1510 that compares the CPU-hours of queries with and without the feedback loop. The improvements are much more significant here because even though the plan change may not be on the critical path of the query, it still translates to fewer CPU-hours. Overall, there is a 55% drop in total CPU-hours, which is significant for dollar savings in terms of operational costs.

Figure 15C:
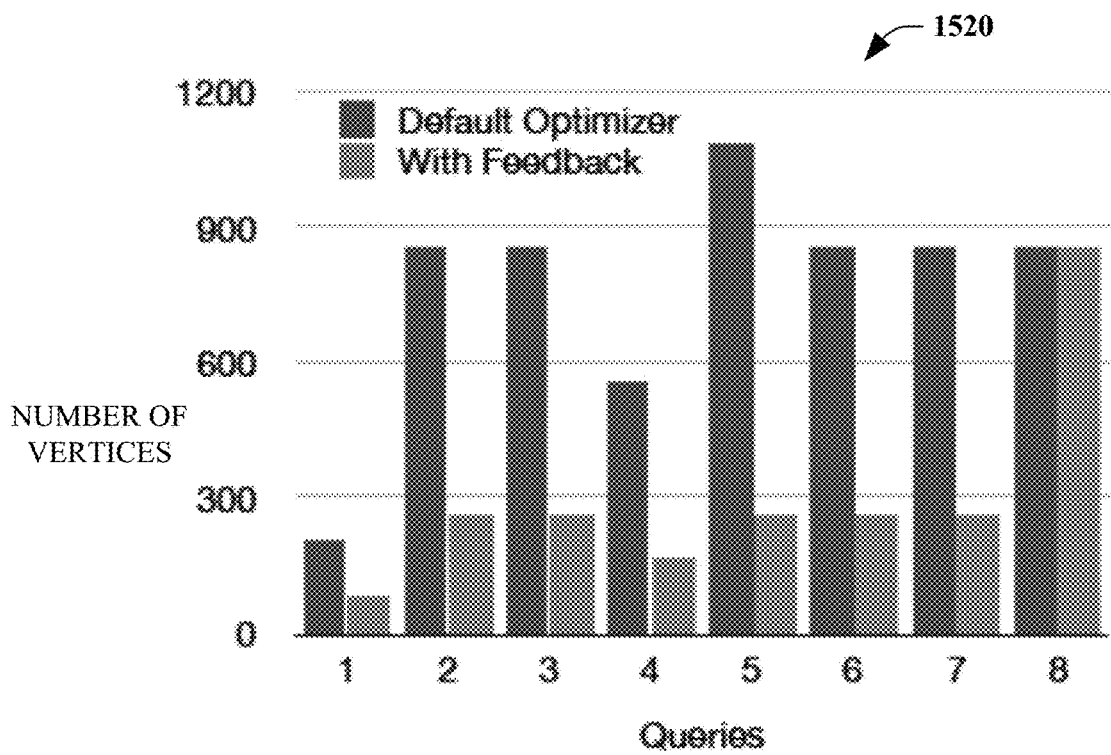
FIG. 15(C) is a bar chart that illustrates the total number of vertices (containers) launched by each of the queries.

Finally, FIG. 15(C) is a bar chart 1520 that illustrates the total number of vertices (containers) launched by each of the queries. Interestingly, the savings are much more significant. This is consistent with the discussion above regarding how the default optimizer significantly overestimates the cardinalities most of the times, resulting in a large number of containers to be launched, each with a very small amount of data to process. Tighter cardinality estimations, using the exemplary models, help avoid wasting these resources. Overall, 60% less vertices were launched using the feedback loop.

Exploration Evaluation

The effectiveness of the exploratory bottom-up query planning algorithm is next evaluated. The focus of the evaluation is to show how quickly the algorithm prunes the search space, exploits unobserved subgraph, and finds the optimal plan. As discussed above, in some embodiments, a prototype provides the join ordering hints which the users can later enforce in their scripts. Thus, for the purpose of evaluation, a synthetic workload along with the unmodified SCOPE cost model was used. The synthetic workload contains a join query over 6 randomly generated tables with varying cardinalities, where any pair of tables can have a join predicate with probability 0.8, and a random join selectivity between 0 to 1.

Figure 16A:
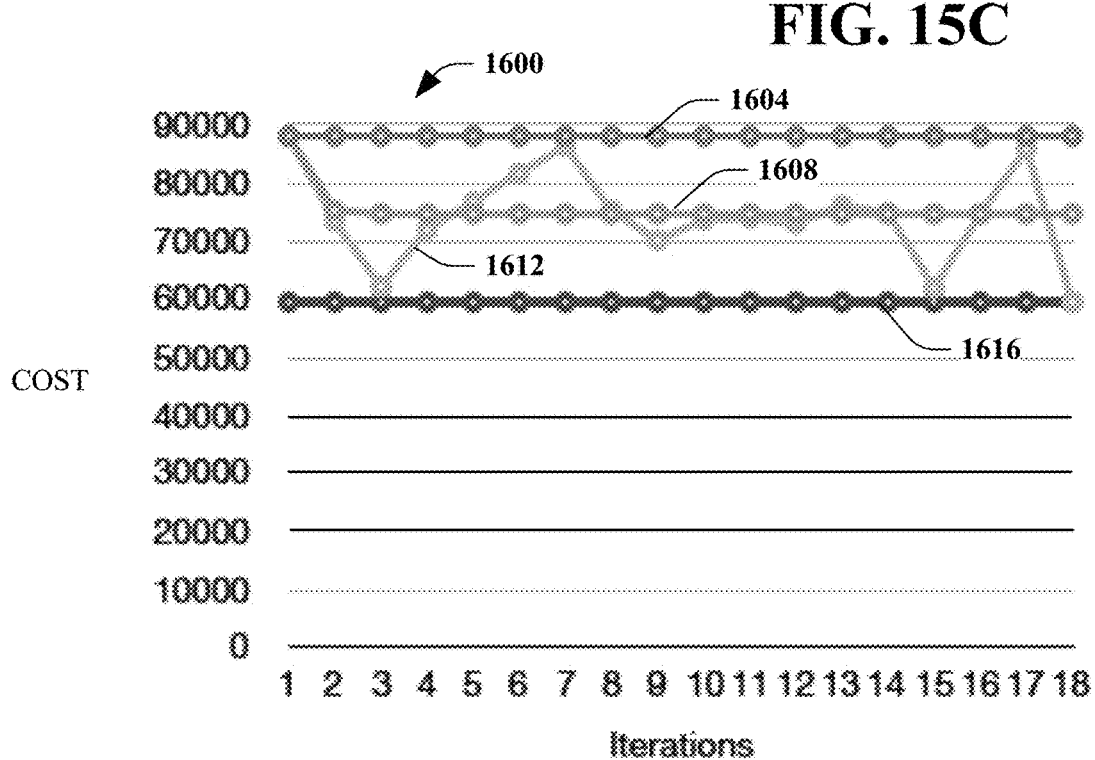
FIG. 16(A) is a graph that compares the cost of the plans chosen by the exploratory algorithm against the plans chosen by several alternatives.

FIG. 16(A) is a graph 1600 that includes an optimizer without feedback distribution 1604, an optimizer with feedback distribution 1608, an optimizer with exploratory join ordering distribution 1612 and an optimum distribution 1616. FIG. 16(A) compares the cost of the plans chosen by the exploratory algorithm against the plans chosen by several alternatives. The default optimizer 1604 with bottom-up (Selinger) planner and without statistics feedback, picks the same sub-optimal plan every time. When the feedback is turned on, the planner picks a better plan at iteration 2 but it does not explore alternate plans in further iterations, and therefore fails to find the optimal. Finally, when exploration is turned on (ranking set to OPT OBSERVATIONS), the planner is able to explore all unobserved subgraphs in 17 more iterations, and eventually find the optimal plan. In some embodiments, by design, the exploratory algorithm considers more expensive alternative(s), however, it prunes out the really expensive ones and never considers the plans more expensive than those produced by the naive Selinger planner.

Figure 16B:
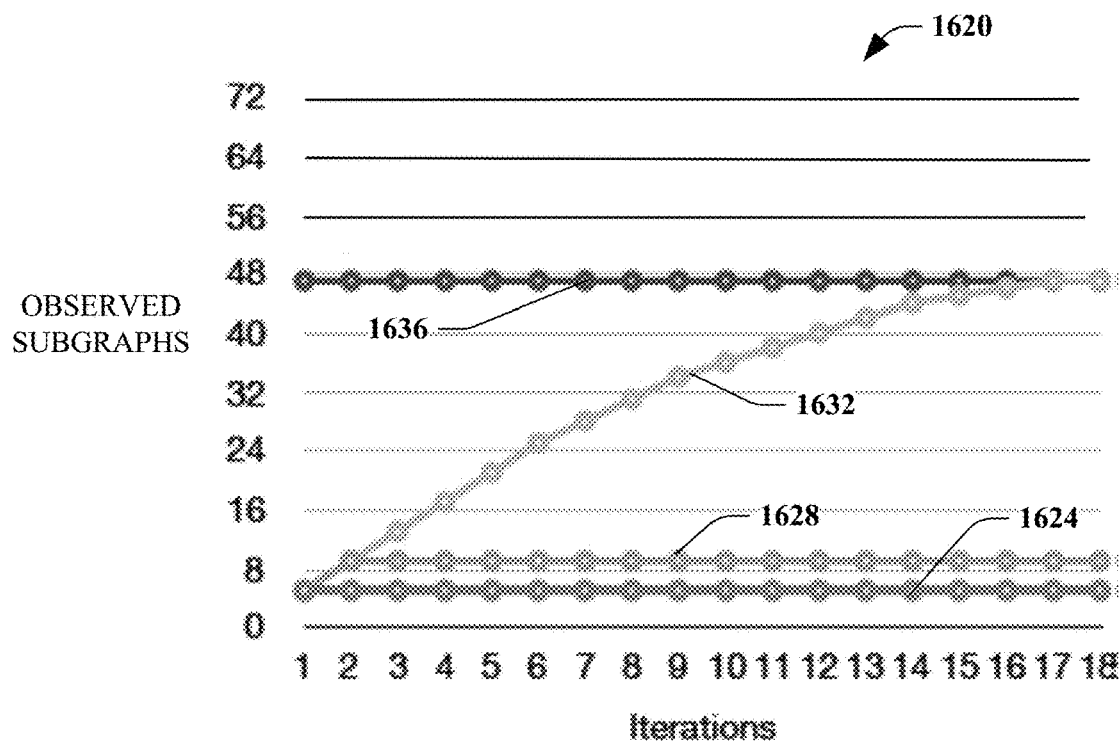
FIG. 16(B) is a graph that compares subgraph observations collected with observed subgraphs.

FIG. 16(B) is a graph 1620 including an optimizer without feedback distribution 1624, an optimizer with feedback distribution 1628, an optimizer with exploratory join ordering 1632, and, a total distribution 1634. FIG. 16(B) illustrates that while the naive Selinger planner and the planner with feedback can only explore a small subset of the subgraphs and build cardinality models over them, the exploratory planner is able to quickly cover all subgraphs in 17 more iterations. The cardinality models built over those newly observed subgraphs could be useful across multiple other queries, in addition to helping find the optimal plan for the current query.

Figure 16C:
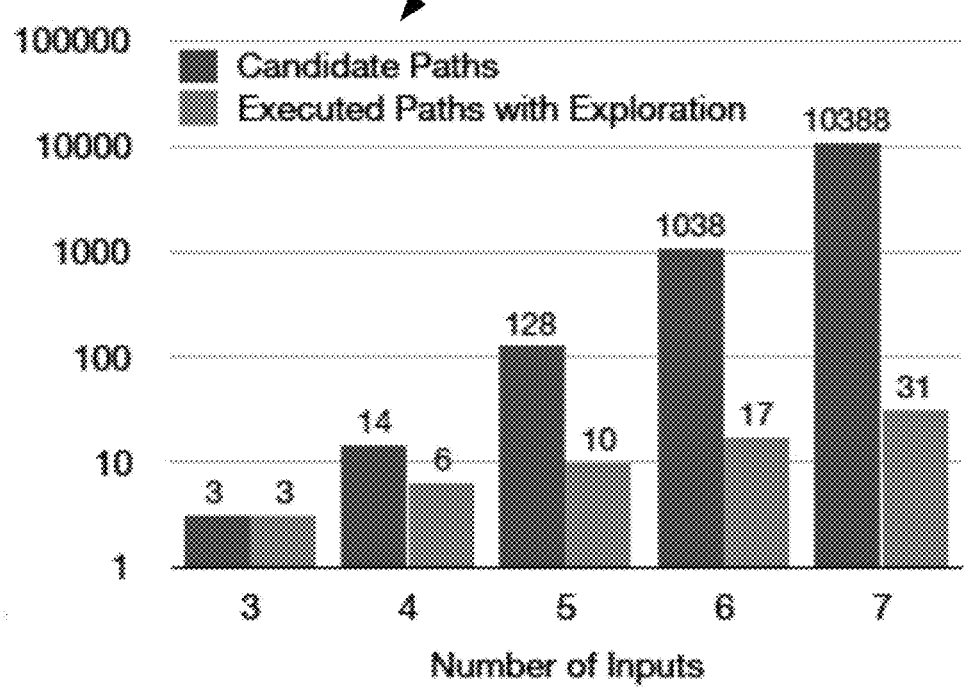
FIG. 16(C) is a bar chart illustrating the number of redundant executions needed for complete exploration when varying the number of inputs.

FIG. 16(C) is a bar chart 1640 illustrating the number of redundant executions needed for complete exploration when varying the number of inputs. It can be observed that while the candidate paths grow exponentially, the number of executions required for the exploratory planner to find the optimal plan only grows in polynomial fashion, e.g., just 31 runs for 7 join inputs. The reason is that the exploratory planner picks the plan that maximizes the number of newly subgraph observations, and the number of distinct subgraphs grows in a polynomial manner with the number of inputs. Once the planner has built cardinality feedback for most subgraphs, it can produce the optimal plan.

In some embodiments, the above evaluation was repeated on the TPC-H dataset (i.e., from http:///www.tpc.org/tpch) using a query that de-normalizes all tables. The exploration planner was able to explore and build all relevant cardinality models using just 36 out of the 759 possible runs. Thus, in some embodiments, the exploratory join ordering planner is indeed able to quickly prune the search space and explore alternative subgraphs, thereby avoiding the bias in learning cardinalities and producing optimal plans eventually.

Figure 17:
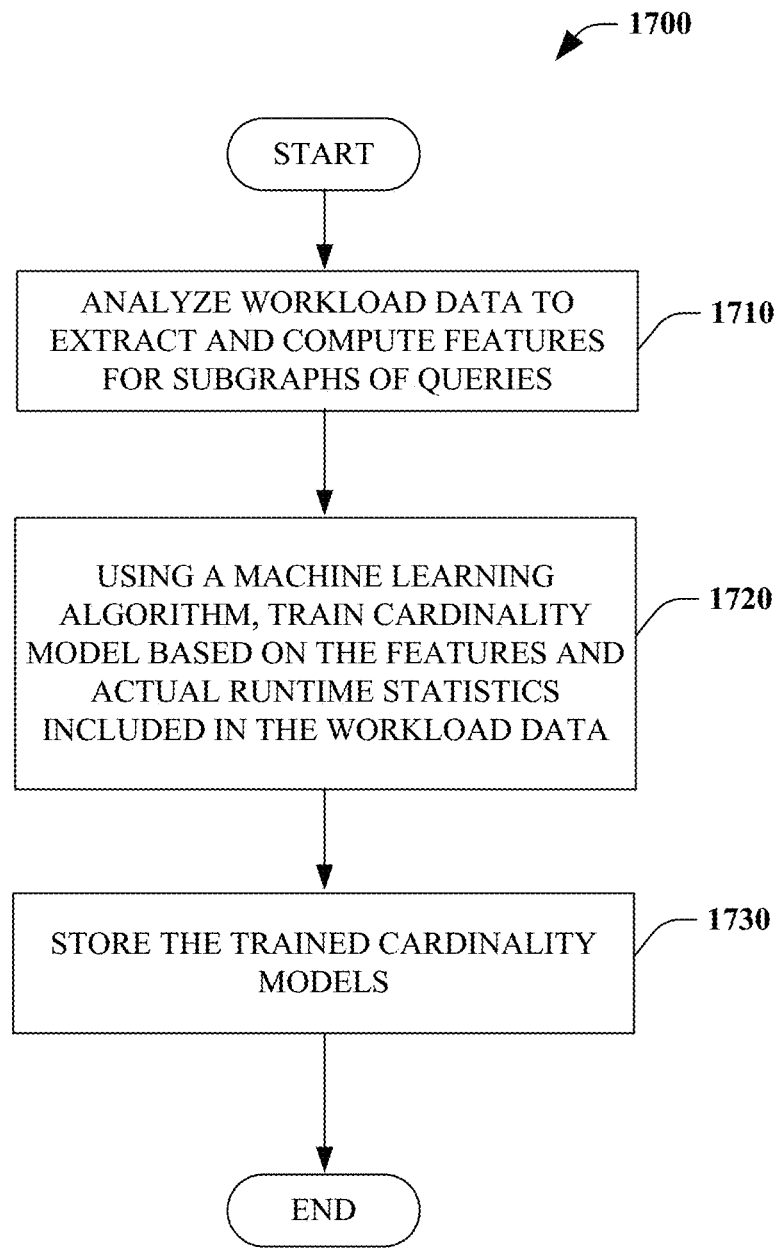
FIG. 17 illustrates an exemplary method of training cardinality models.
Figure 18:
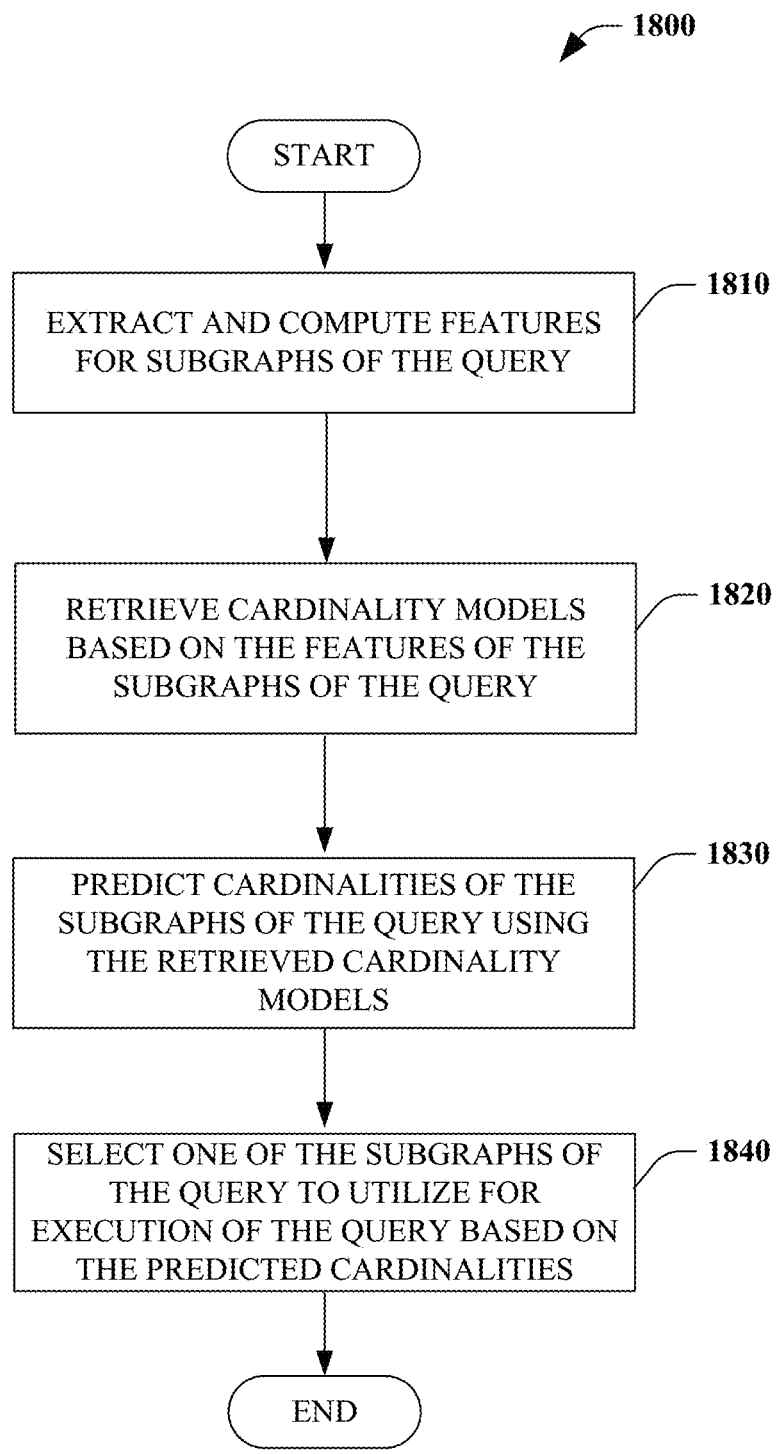
FIG. 18 illustrates an exemplary method of method of predicting cardinality of subgraphs of a query.
Figure 19:
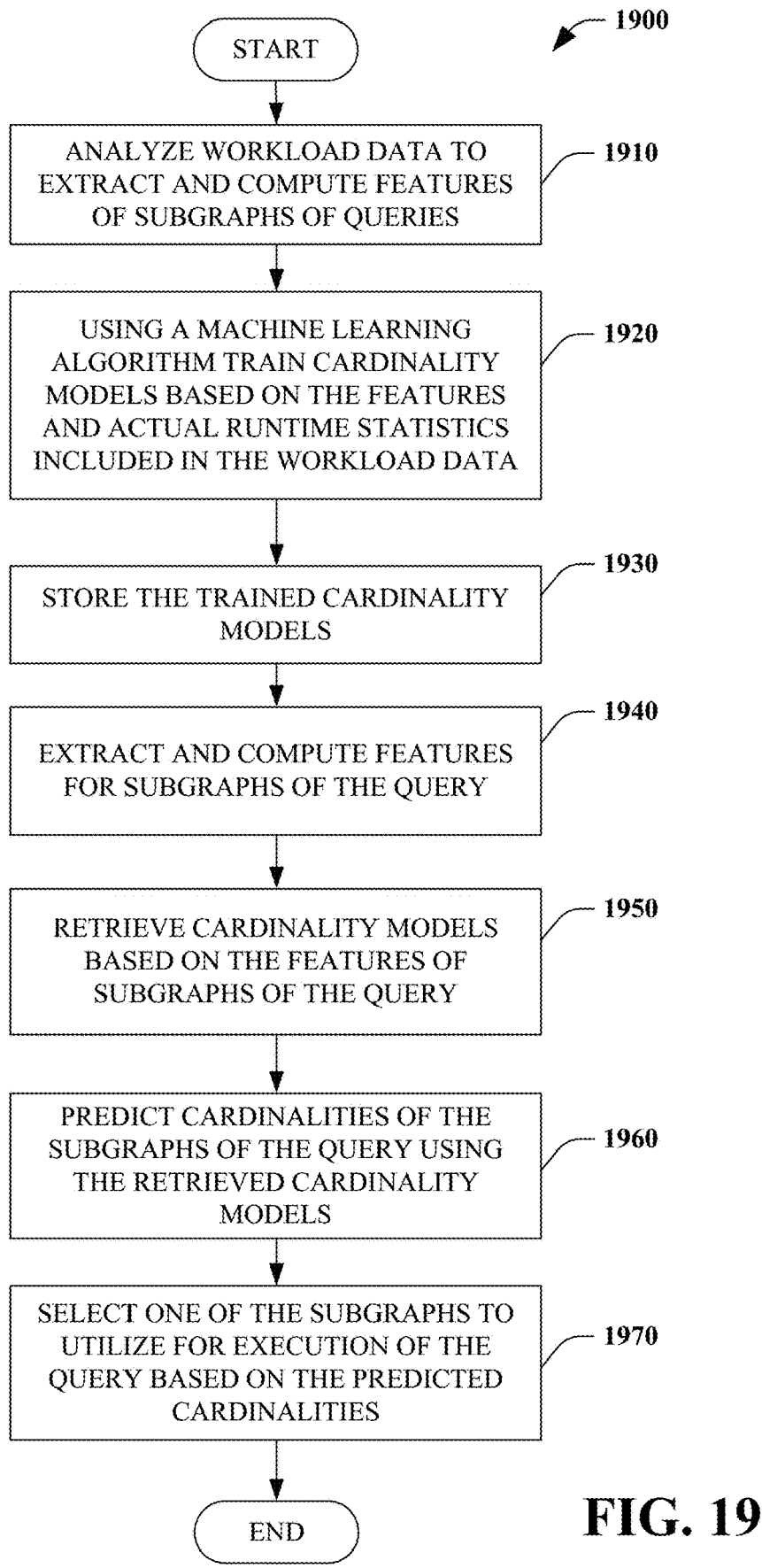
FIG. 19 illustrates an exemplary method of a method of predicting cardinality of subgraphs of a query.

FIGS. 17-19 illustrate exemplary methodologies relating to training cardinality models and/or using trained cardinality models to predict cardinality. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 17, a method of training cardinality models 1700 is illustrated. In some embodiments, the method 1700 is performed by the system 200.

At 1710, a workload data is analyzed to extract and compute features for subgraphs of queries. At 1720, cardinality models (e.g., one for each subgraph) are trained using a machine learning algorithm based on the features and actual runtime statistics include in the workload data. At 1730, the trained cardinality models are stored.

Turning to FIG. 18, a method of predicting cardinality of subgraphs of a query is illustrated. In some embodiments, the method 1800 is performed by the system 100.

At 1810, features for subgraphs of the query are extracted and computed. At 1820, cardinality models are retrieved based on the features of subgraphs of the query (e.g., matching subgraphs). At 1830, cardinalities of the subgraphs of the query are predicted using the retrieved cardinality models. At 1840, one of the subgraphs of the query is selected to be utilized for execution of the query based on the predicted cardinalities.

Next, referring to FIG. 19, a method of predicting cardinality of subgraphs of a query is illustrated. In some embodiments, the method 1900 is performed by the system 300.

At 1910, workload data is analyzed to extract and compute features of subgraphs of queries. At 1920, cardinality models are trained using a machine learning algorithm based on the features and actual runtime statistics include in the workload data. At 1930, the trained cardinality models are stored.

At 1940, features for subgraphs of the query are extracted and computed. At 1950, cardinality models are retrieved based on the features of the subgraphs of the query. At 1960, cardinalities of the subgraphs of the query are predicted using the cardinality models. At 1950, one of the subgraphs is selected to be utilized for execution of the query based on the predicted cardinalities.

Described herein is a system for training cardinality models, comprising: a computer comprising a processor and a memory having computer-executable instructions stored thereupon which, when executed by the processor, cause the computer to: analyze workload data to extract and compute features of subgraphs of queries; using a machine learning algorithm, train the cardinality models based on the features and actual runtime statistics included in the workload data; and store the trained cardinality models.

The system can include wherein the extracted features comprise, for a particular subgraph of a particular query, at least one of a job name, a total cardinality of all inputs to the particular subgraph, a name of all input datasets to the particular subgraph, or one or more parameters in the particular subgraph. The system can further include wherein the computed features comprise, for a particular subgraph of a particular query, at least one of a normalized job name, a square of an input cardinality of the particular subgraph, a square root of the input cardinality of the particular subgraph, a log of the input cardinality of the particular subgraph, or an average output row length.

The system can include wherein the cardinality models are based on at least one of a linear regression algorithm, a Poisson regression algorithm, or a multi-layer perceptron neural network.

The system can further include wherein at least one of a priority level or a confidence level is stored with the trained cardinality models. The system can include the memory having computer-executable instructions stored thereupon which, when executed by the processor, cause the computer to: during training of the cardinality models, whenever a particular subgraph is more computationally expensive than a full query plan, stop exploring join orders which involve that particular subgraph.

The system can include the memory having further computer-executable instructions stored thereupon which, when executed by the processor, cause the computer to: during training of the cardinality models, for two equivalent subgraphs, select a particular subgraph which maximizes a number of new subgraphs observed. The system can include the memory having further computer-executable instructions stored thereupon which, when executed by the processor, cause the computer to: extract and compute features for subgraphs of a query; retrieve cardinality models based on the features of the subgraphs of the query; predict cardinalities of the subgraphs of the query using the retrieved cardinality models; and select one of the subgraphs of the query to utilize for execution of the query based on the predicted cardinalities.

Described herein is a method of predicting cardinality of subgraphs of a query, comprising: extracting and computing features for the subgraphs of the query; retrieving cardinality models based on the features of the subgraphs of the query; predicting cardinalities of the subgraphs of the query using the retrieved cardinality models; and selecting one of the subgraphs of the query to utilize for execution of the query based on the predicted cardinalities.

The method can include executing the query using the selected subgraph of the query. The method can further include wherein the extracted features comprise, for a particular subgraph of a particular query, at least one of a job name, a total cardinality of all inputs to the particular subgraph, a name of all input datasets to the particular subgraph, or one or more parameters in the particular subgraph. The method can include wherein the computed features comprise, for a particular subgraph of a particular query, at least one of a normalized job name, a square of an input cardinality of the particular subgraph, a square root of the input cardinality of the particular subgraph, a log of the input cardinality of the particular subgraph, or an average output row length.

The method can further include wherein the cardinality models are based on at least one of a linear regression algorithm, a Poisson regression algorithm, or a multi-layer perceptron neural network. The method can further include wherein at least one of a priority level or a confidence level is stored with the trained cardinality models and used when selecting one of the subgraphs of the query to utilize for execution of the query.

Described herein is a computer storage media storing computer-readable instructions that when executed cause a computing device to: analyze workload data to extract and compute features of subgraphs of queries; using a machine learning algorithm, train the cardinality models based on the features and actual runtime statistics included in the workload data, and store the trained cardinality model; extract and compute features for the subgraphs of the query; retrieve cardinality models based on the features of the subgraphs of the query; predict cardinalities of the subgraphs of the query using the retrieved cardinality models; and select one of the subgraphs of the query to utilize for execution of the query based on the predicted cardinalities.

The computer storage media can store further computer-readable instructions that when executed cause the computing device to: execute the query using the selected subgraph of the query. The computer storage media can further include wherein the extracted features comprise, for a particular subgraph of a particular query, at least one of a job name, a total cardinality of all inputs to the particular subgraph, a name of all input datasets to the particular subgraph, or one or more parameters in the particular subgraph.

The computer storage media can further include wherein the computed features comprise, for a particular subgraph of a particular query, at least one of a normalized job name, a square of an input cardinality of the particular subgraph, a square root of the input cardinality of the particular subgraph, a log of the input cardinality of the particular subgraph, or an average output row length.

The computer storage media can further include wherein the cardinality models are based on at least one of a linear regression algorithm, a Poisson regression algorithm, or a multi-layer perceptron neural network. The computer storage media can further include wherein at least one of a priority level or a confidence level is stored with the trained cardinality models and used when selecting one of the subgraphs of the query to utilize for execution of the query.

Figure 20:
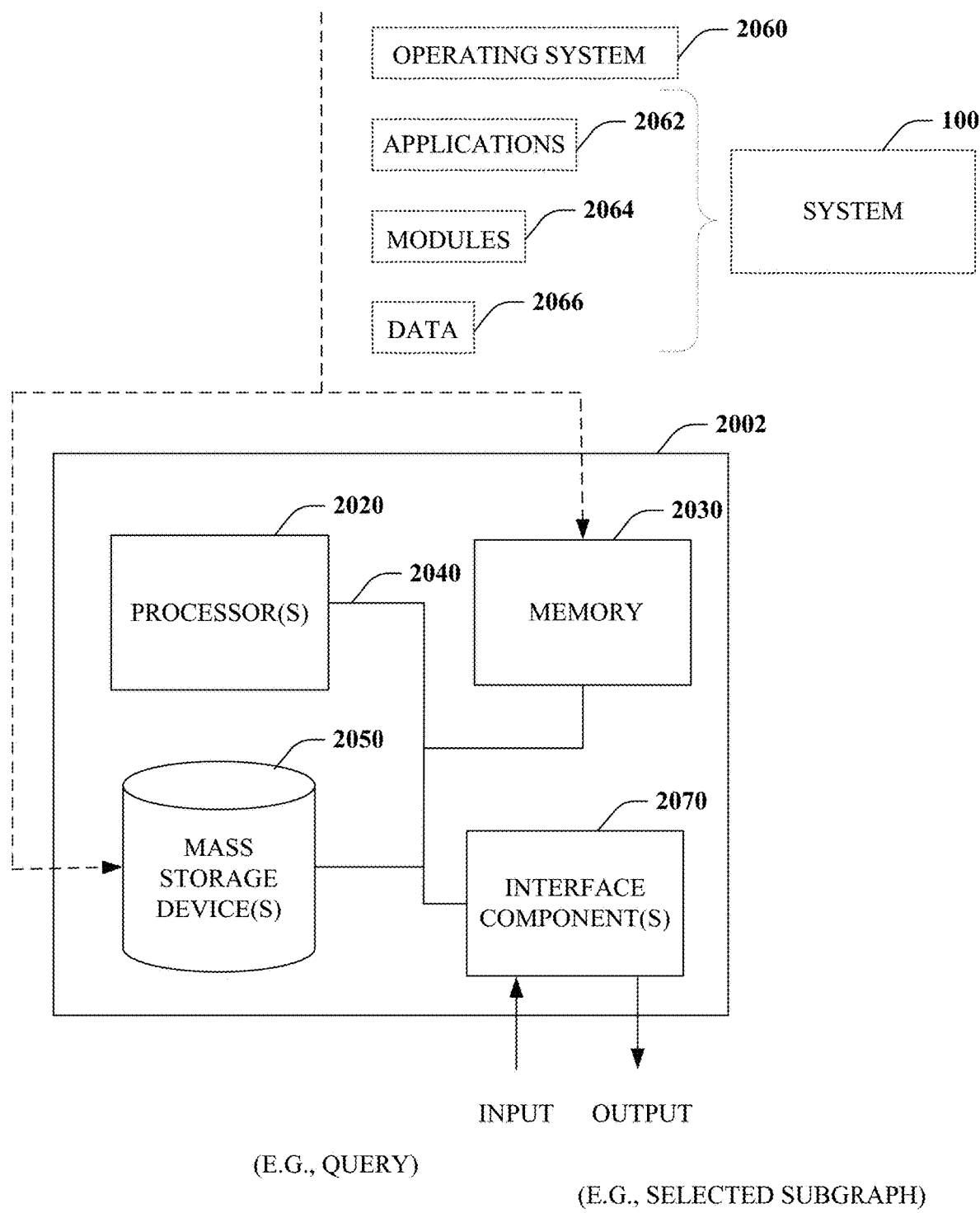
FIG. 20 is a functional block diagram that illustrates an exemplary computing system.

With reference to FIG. 20, illustrated is an example general-purpose computer or computing device 2002 (e.g., mobile phone, desktop, laptop, tablet, watch, server, handheld, programmable consumer or industrial electronics, set-top box, game system, compute node). For instance, the computing device 2002 may be used in the system for predicting cardinality of subgraphs of a query 100, the system for training a cardinality model 200, and/or the feedback loop architecture 300.

The computer 2002 includes one or more processor(s) 2020, memory 2030, system bus 2040, mass storage device(s) 2050, and one or more interface components 2070. The system bus 2040 communicatively couples at least the above system constituents. However, it is to be appreciated that in its simplest form the computer 2002 can include one or more processors 2020 coupled to memory 2030 that execute various computer executable actions, instructions, and or components stored in memory 2030. The instructions may be, for instance, instructions for implementing functionality described as being carried out by one or more components discussed above or instructions for implementing one or more of the methods described above.

The processor(s) 2020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 2020 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 2020 can be a graphics processor.

The computer 2002 can include or otherwise interact with a variety of computer-readable media to facilitate control of the computer 2002 to implement one or more aspects of the claimed subject matter. The computer-readable media can be any available media that can be accessed by the computer 2002 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid state devices (e.g., solid state drive (SSD), flash memory drive (e.g., card, stick, key drive)), or any other like mediums that store, as opposed to transmit or communicate, the desired information accessible by the computer 2002. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 2030 and mass storage device(s) 2050 are examples of computer-readable storage media. Depending on the exact configuration and type of computing device, memory 2030 may be volatile (e.g., RAM), non-volatile (e.g., ROM, flash memory) or some combination of the two. By way of example, the basic input/output system (BIOS), including basic routines to transfer information between elements within the computer 2002, such as during start-up, can be stored in nonvolatile memory, while volatile memory can act as external cache memory to facilitate processing by the processor(s) 2020, among other things.

Mass storage device(s) 2050 includes removable/non-removable, volatile/non-volatile computer storage media for storage of large amounts of data relative to the memory 2030. For example, mass storage device(s) 2050 includes, but is not limited to, one or more devices such as a magnetic or optical disk drive, floppy disk drive, flash memory, solid-state drive, or memory stick.

Memory 2030 and mass storage device(s) 2050 can include, or have stored therein, operating system 2060, one or more applications 2062, one or more program modules 2064, and data 2066. The operating system 2060 acts to control and allocate resources of the computer 2002. Applications 2062 include one or both of system and application software and can exploit management of resources by the operating system 2060 through program modules 2064 and data 2066 stored in memory 2030 and/or mass storage device (s) 2050 to perform one or more actions. Accordingly, applications 2062 can turn a general-purpose computer 2002 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 2062, and include one or more modules 2064 and data 2066 stored in memory and/or mass storage device(s) 2050 whose functionality can be realized when executed by one or more processor(s) 2020.

In accordance with one particular embodiment, the processor(s) 2020 can correspond to a system on a chip (SOC) or like architecture including, or in other words integrating, both hardware and software on a single integrated circuit substrate. Here, the processor(s) 2020 can include one or more processors as well as memory at least similar to processor(s) 2020 and memory 2030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 2002 also includes one or more interface components 2070 that are communicatively coupled to the system bus 2040 and facilitate interaction with the computer 2002. By way of example, the interface component 2070 can be a port (e.g., serial, parallel, PCMCIA, USB, FireWire) or an interface card (e.g., sound, video) or the like. In one example implementation, the interface component 2070 can be embodied as a user input/output interface to enable a user to enter commands and information into the computer 2002, for instance by way of one or more gestures or voice input, through one or more input devices (e.g., pointing device such as a mouse, trackball, stylus, touch pad, keyboard, microphone, joystick, game pad, satellite dish, scanner, camera, other computer). In another example implementation, the interface component 2070 can be embodied as an output peripheral interface to supply output to displays (e.g., LCD, LED, plasma), speakers, printers, and/or other computers, among other things. Still further yet, the interface component 2070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   at least one processor; and
   a memory having computer-executable instructions stored thereupon which, when executed by the at least one processor, cause the system to:
   analyze workload data to determine features of operator subgraphs of queries;
   using a machine learning algorithm, train a particular cardinality model for a particular operator subgraph based at least on the features and actual runtime statistics included in the workload data for at least two different jobs that include different parameters or different data inputs, the particular operator subgraph comprising a sequence of operators that occurs in the at least two different jobs; and
   store the particular cardinality model.

2. The system of claim 1, wherein the extracted features comprise, for an occurrence of an individual operator subgraph in an individual job in the workload data, at least one of a job name of the individual job, a total cardinality of all inputs to the individual operator subgraph, a name of all input datasets to the individual operator subgraph, or one or more parameters in the individual operator subgraph.

3. The system of claim 1, wherein the features comprise, for an occurrence of an individual operator subgraph in an individual job in the workload data, at least one of a normalized job name of the individual job, a square of an input cardinality of the individual operator subgraph, a square root of the input cardinality of the individual operator subgraph, a log of the input cardinality of the individual operator subgraph, or an average output row length.

4. The system of claim 1, wherein the particular cardinality model is based on at least one of a linear regression algorithm, a Poisson regression algorithm, or a multi-layer perceptron neural network.

5. The system of claim 1, the memory having further computer-executable instructions stored thereupon which, when executed by the processor, cause the system to:
   store at least one of a priority level or a confidence level with the particular cardinality model.

6. The system of claim 1, the memory having further computer-executable instructions stored thereupon which, when executed by the processor, cause the system to:
   during training of another cardinality model for another operator subgraph, determine that the another operator subgraph is more computationally expensive than a full query plan and stop exploring join orders which involve that individual operator subgraph.

7. The system of claim 1, the memory having further computer-executable instructions stored thereupon which, when executed by the processor, cause the system to:
   during training of cardinality models for two equivalent operator subgraphs including the particular operator subgraph and another operator subgraph, select the particular operator subgraph for training based at least on a determination that the particular operator subgraph maximizes a number of new subgraphs observed relative to the another operator subgraph.

8. The system of claim 1, the memory having further computer-executable instructions stored thereupon which, when executed by the processor, cause the system to:
   predict a cardinality of the particular operator subgraph for a received query using the retrieved particular cardinality model; and
   determine whether to utilize the particular operator subgraph for execution of the received query based on the predicted cardinality.

9. A method, comprising:
   determining features for operator subgraphs that can be used to execute a query, each operator subgraph comprising a different sequence of two or more operators;
   retrieving cardinality models for the operator subgraphs;
   predicting cardinalities of the operator subgraphs for executing the query using the features and the cardinality models; and
   selecting a particular operator subgraph to utilize for execution of the query based at least on the predicted cardinalities.

10. The method of claim 9, further comprising:
executing the query using the particular operator subgraph.

11. The method of claim 9, wherein the features reflect at least one of job names, input cardinality, input dataset names, or operator subgraph parameters.

12. The method of claim 9, wherein the features reflect at least one of normalized job names, squares of input cardinalities, square roots of input cardinalities, logs of input cardinalities, or average row length outputs.

13. The method of claim 9, wherein the cardinality models are based on at least one of a linear regression algorithm, a Poisson regression algorithm, or a multi-layer perceptron neural network.

14. The method of claim 9, wherein at least one of a priority level or a confidence level is stored with the cardinality models and used when selecting the particular operator subgraph to utilize for execution of the query.

15. A computer storage media storing computer-readable instructions that, when executed, cause a computing device to:
analyze workload data to determine features of a plurality of operator subgraphs, each operator subgraph comprising a sequence of two or more operators;
using a machine learning algorithm, train cardinality models for the operator subgraphs based at least on the features and actual runtime statistics included in the workload data for jobs that include individual operator subgraphs of the plurality;
receive a query having particular operator subgraphs that can be used to execute the query;
retrieve respective cardinality models for the particular operator subgraphs;
predict cardinalities of the particular operator subgraphs using the respective cardinality models; and
select a specific operator subgraph of the particular operator subgraphs to utilize for execution of the query based at least on the predicted cardinalities.

16. The computer storage media of claim 15, storing further computer-readable instructions that, when executed, cause the computing device to:
execute the query using the specific operator subgraph.

17. The computer storage media of claim 15, wherein the features identify job names of individual jobs which involved execution of the individual operator subgraphs.

18. The computer storage media of claim 15, wherein the features identify average row output length.

19. The computer storage media of claim 15, wherein the cardinality models are based on at least one of a linear regression algorithm, a Poisson regression algorithm, or a multi-layer perceptron neural network.

20. The computer storage media of claim 15, wherein at least one of a priority level or a confidence level is stored with the cardinality models and used when selecting the specific operator subgraph to utilize for execution of the query.

* * * * *